United States Patent
Kang

(10) Patent No.: US 8,755,600 B2
(45) Date of Patent: Jun. 17, 2014

(54) METHOD AND APPARATUS FOR DETERMINING THE LIGHT DIRECTION

(75) Inventor: Tae-hoon Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 866 days.

(21) Appl. No.: 12/958,576

(22) Filed: Dec. 2, 2010

(65) Prior Publication Data

US 2011/0129149 A1 Jun. 2, 2011

(30) Foreign Application Priority Data

Dec. 2, 2009 (KR) .................. 10-2009-0118463

(51) Int. Cl.
*G06K 9/00* (2006.01)
*G06K 9/40* (2006.01)

(52) U.S. Cl.
USPC ............................. 382/168; 382/118; 382/274

(58) Field of Classification Search
None
See application file for complete search history.

(56) References Cited

U.S. PATENT DOCUMENTS

| | | | | |
|---|---|---|---|---|
| 7,130,453 B2 * | 10/2006 | Kondo et al. | ................. | 382/117 |
| 7,200,265 B2 * | 4/2007 | Imai | ............................... | 382/168 |
| 2003/0118217 A1 * | 6/2003 | Kondo et al. | ................. | 382/117 |
| 2003/0231347 A1 * | 12/2003 | Imai | ............................... | 358/2.1 |

FOREIGN PATENT DOCUMENTS

| | | |
|---|---|---|
| JP | 2004-201228 A | 7/2004 |
| JP | 2008-244587 A | 10/2008 |

* cited by examiner

*Primary Examiner* — Bernard Krasnic
(74) *Attorney, Agent, or Firm* — Drinker Biddle & Reath LLP

(57) ABSTRACT

Provided are a method and apparatus for processing a digital image signal, and a recording medium having recorded thereon the method, in which an image including a subject is generated, a subject region is formed by detecting the subject from the image, the subject region is divided into at least two regions, histograms for the at least two regions are generated, respectively, and it is determined whether a light direction is side lighting by analyzing the histograms for the at least two regions.

46 Claims, 20 Drawing Sheets

METHOD AND APPARATUS FOR DETERMINING THE LIGHT DIRECTION

CROSS-REFERENCE TO RELATED PATENT APPLICATION

This application claims the benefit of Korean Patent Application No. 10-2009-0118463, filed on Dec. 2, 2009, in the Korean Intellectual Property Office, the entire disclosure of which is incorporated herein by reference.

BACKGROUND

1. Field of the Invention

Embodiments of the invention relates to a method and apparatus for processing a digital image signal, and a recording medium having recorded thereon the method.

2. Description of the Related Art

A digital camera generates an image from light incident to a subject. The quality of the image is affected by the direction in which an external light strikes the subject and is reflected off the subject and is then received by the digital camera. Often, the user of the digital camera can check whether the subject is properly illuminated from an image displayed on a liquid crystal display (LCD) screen in a live-view mode. For example, using the live-view mode the user can often discern that back lighting will result in a poor image quality. However, the resolution of the LCD screen used for the live-view mode may be poor making it difficult for a user to determine the direction of an external light and whether the quality of the image with be good.

SUMMARY

Therefore, there is a need in the art for a method and apparatus for processing a digital image signal, which allows a user to determine a light direction, and a recording medium having recorded thereon the method.

According to embodiments of the invention, there is provided a method of processing a digital image signal, the method including generating an image including a subject, forming a subject region by recognizing the subject from the image, dividing the subject region into at least two regions, generating histograms for the at least two regions, respectively, and determining whether a light direction is side lighting by analyzing the histograms for the at least two regions.

In the method, the subject may be a face.

In the method, the subject region may be divided into two regions including a left region and a right region, and a first histogram for the left region of the subject region and a second histogram for the right region of the subject region may be generated.

In the method, the determining of whether the light direction is side lighting by analyzing the histograms may include comparing a gray scale difference between a first peak region including a first peak in the first histogram a second peak region including a second peak in the second histogram with a first reference value, determining that the light direction is side lighting if the gray scale difference is greater than the first reference value, and determining that the light direction is front/back lighting if the gray scale difference is not greater than the first reference value.

The method may further include, if it is determined that the light direction is side lighting, comparing gray scales of the first peak region with gray scales of the second peak region, determining that the light direction is left-hand side lighting if the gray scales of the first peak region are greater than those of the second peak region, and determining that the light direction is right-hand side lighting if the gray scales of the first peak region are not greater than those of the second peak region.

The method may further include, if it is determined that the light direction is front/back lighting, comparing gray scales of the first peak region or gray scales of the second peak region with a first reference gray scale, determining that the light direction is back lighting if the first peak region is located in a region having gray scales being less than a first reference gray scale in the first histogram or if the second peak region is located in a region having gray scales being less than the first reference gray scale in the second histogram, and determining that the light direction is front lighting if the first peak region is located in a region having gray scales exceeding the first reference gray scale in the first histogram or if the second peak region is located in a region having gray scales exceeding the first reference gray scale in the second histogram.

In the method, the determining of whether the light direction is side lighting by analyzing the histograms may include comparing a difference between a first average of the first histogram and a second average of the second histogram with a second reference value, determining that the light direction is side lighting if the difference between the first average and the second average is greater than the second reference value, and determining that the light direction is front/back lighting if the difference between the first average and the second average is not greater than the second reference value.

The method may further include, if it is determined that the light direction is side lighting, comparing the first average with the second average, determining that the light direction is left-hand side lighting if the first average is greater than the second average, and determining that the light direction is right-hand side lighting if the first average is not greater than the second average.

The method may further include, if it is determined that the light direction is front/back lighting, comparing the first average or the second average with a second reference gray scale, determining that the light direction is back lighting if the first average or the second average is less than the second reference gray scale, and determining that the light direction is front lighting if the first average or the second average exceeds the second reference gray scale.

The method may further include, in addition the analyzing of the histograms for the at least two regions, deriving a first luminance for the left region of the subject region, deriving a second luminance for the right region of the subject region, comparing a difference between the first luminance and the second luminance with a third reference value, determining that the light direction is side lighting if the difference is greater than the third reference value, and determining that the light direction is front/back lighting if the difference is not greater than the third reference value.

The method may further include, if it is determined that the light direction is side lighting, comparing the first luminance with the second luminance, determining that the light direction is left-hand side lighting if the first luminance is greater than the second luminance, and determining that the light direction is right-hand side lighting if the first luminance is not greater than the second luminance.

The method may further include, if it is determined that the light direction is front/back lighting, comparing the first luminance or the second luminance with a reference luminance, determining that the light direction is back lighting if the first luminance or the second luminance is not greater than the reference luminance, and determining that the light direction is front lighting if the first luminance or the second luminance is greater than the reference luminance.

The method may further include deriving a contour of the subject, comparing a contrast of the contour of the subject with a reference contrast, and determining that the light direction is back lighting if the contrast of the contour of the subject is greater than the reference contrast.

The method may further include deriving a luminance of the subject region and a luminance of a background region remaining after excluding the subject region, and determining whether the light direction is back lighting by analyzing the luminance of the subject region and the luminance of the background region.

The method may further include dividing the subject region into two regions including an upper region and a lower region if it is determined that the light direction is side lighting.

The method may further include generating a third histogram for the upper region of the subject region and a fourth histogram for the lower region of the subject region, and determining whether the light direction is one of left-hand front side lighting, right-hand front side lighting, left-hand plane lighting, and right-hand plane lighting by analyzing the third histogram and the fourth histogram.

The method may further include deriving a third luminance for the upper region of the subject region and a fourth luminance for the lower region of the subject region, and determining whether the light direction is one of left-hand front side lighting, right-hand front side lighting, left-hand plane lighting, and right-hand plane lighting by analyzing the third luminance and the fourth luminance.

The method may further include deriving the number of first peak regions including a first peak in the first histogram and the number of second peak regions including a second peak in the second histogram, if the number of first peak regions is plural or the number of second peak regions is plural, determining whether the plural first peak regions or the plural second peak regions are distributed in a dark region and a bright region of the first histogram or the second histogram, and determining that the light direction is cross lighting if the plural first peak regions or the plural second peak regions are distributed in the dark region and the bright region of the first histogram or the second histogram.

The method may further include, if the number of first peak regions is plural or the number of second peak regions is plural, comparing a difference between a first average of the first histogram and a second average of the second histogram with a fourth reference value, and determining that the light direction is cross lighting if the difference between the first average and the second average is greater than the fourth reference value.

The method may further include, if the number of first peak regions is plural or the number of second peak regions is plural, comparing a difference between a first luminance of the left region and a second luminance of the right region with a fifth reference value, and determining that the light direction is cross lighting if the difference between the first luminance and the second luminance is greater than the fifth reference value.

The method may further include determining that the light direction is left-hand cross lighting if the plural first peak regions are located in the left side and the right side with respect to a reference gray scale of the first histogram, and determining that the light direction is right-hand cross lighting if the plural second peak regions are located in the left side and the right side with respect to a reference gray scale of the second histogram.

The method may further include dividing the subject region into four regions including an upper region, a lower region, a left region, and a right region, generating histograms for the four regions, respectively, and determining whether the light direction is one of front lighting, back lighting, left-hand front side lighting, right-hand front side lighting, left-hand plane lighting, right-hand plane lighting, left-hand cross lighting, and right-hand cross lighting by analyzing peak regions including peaks in or averages of the histograms for the four regions.

The method may further include, in addition to the analyzing of the peak regions in or the averages of the histograms, deriving luminances for the four regions, respectively, and determining whether the light is one of front lighting, back lighting, left-hand front side lighting, right-hand front side lighting, left-hand plane lighting, right-hand plane lighting, left-hand cross lighting, and right-hand cross lighting by analyzing the luminances for the four regions.

According to another aspect of the invention, there is provided a recording medium having recorded thereon the method of processing a digital image signal as a computer-readable program code.

According to another aspect of the invention, there is provided an apparatus for processing a digital image signal, the apparatus including an image generation unit generating an image including a subject, a subject recognition unit forming a subject region by detecting the subject from the image, a region division unit dividing the subject region into at least two regions, a histogram generation unit generating histograms for the at least two regions, respectively, and a light direction determination unit determining whether a light direction is side lighting by analyzing the histograms for the at least two regions.

In the apparatus, the subject may be a face.

In the apparatus, the region division unit may divide the subject region into two regions including a left region and a right region, and the histogram generation unit may generate a first histogram for the left region of the subject region and a second histogram for the right region of the subject region.

In the apparatus, the light direction determination unit may include a peak region derivation unit deriving a first peak region including a first peak in the first histogram a second peak region including a second peak in the second histogram, a peak region difference calculation unit deriving a gray scale difference between the first peak region and the second peak region, a first comparison unit comparing the gray scale difference between the first peak region and the second peak region with a first reference value, and a first determination unit determining that the light direction is side lighting if the gray scale difference is greater than the first reference value, and determining that the light direction is front/back lighting if the gray scale difference is not greater than the first reference value.

In the apparatus, if the first determination unit determines that the light direction is side lighting, the light direction determination unit may further include a second comparison unit comparing gray scales of the first peak region with gray scales of the second peak region, and a second determination unit determining that the light direction is left-hand side lighting if the gray scales of the first peak region are greater than those of the second peak region, and determining that the light direction is right-hand side lighting if the gray scales of the first peak region are not greater than those of the second peak region.

In the apparatus, if the first determination unit determines that the light direction is front/back lighting, the light direction determination unit may further include a third comparison unit comparing gray scales of the first peak region or gray scales of the second peak region with a first reference gray scale, and a third determination unit determining that the light direction is back lighting if the first peak region is located in a region having gray scales being less than a first reference gray scale in the first histogram or if the second peak region is located in a region having gray scales being less than the first reference gray scale in the second histogram, and determining that the light direction is front lighting if the first peak region is located in a region having gray scales exceeding the first reference gray scale in the first histogram or if the second peak region is located in a region having gray scales exceeding the first reference gray scale in the second histogram.

In the apparatus, the light direction determination unit may include an average calculation unit deriving a first average of the first histogram and a second average of the second histogram, an average difference calculation unit deriving a difference between the first average and the second average, a first comparison unit comparing the difference between the first average and the second average with a second reference value, and a first determination unit determining that the light direction is side lighting if a difference between the first average and the second average is greater than the second reference value, and determining that the light direction is front/back lighting if the difference between the first average and the second average is not greater than the second reference value.

In the apparatus, if the first determination unit determines that the light direction is side lighting, the light direction determination unit may further include a second comparison unit comparing the first average with the second average, and a second determination unit determining that the light direction is left-hand side lighting if the first average is greater than the second average, and determining that the light direction is right-hand side lighting if the first average is not greater than the second average.

In the apparatus, if the first determination unit determines that the light direction is front/back lighting, the light direction determination unit may further include a third comparison unit comparing the first average or the second average with a second reference gray scale, and a third determination unit determining that the light direction is back lighting if the first average or the second average is less than the second reference gray scale, and determining that the light direction is front lighting if the first average or the second average exceeds the second reference gray scale.

The apparatus may further include a luminance derivation unit deriving a first luminance for the left region of the subject region and deriving a second luminance for the right region of the subject region, in which the light direction determination unit may further include a luminance difference calculation unit deriving a difference between the first luminance and the second luminance, a first luminance comparison unit comparing the difference between the first luminance and the second luminance with a third reference value, and a first luminance determination unit determining that the light direction is side lighting if the difference is greater than the third reference value, and determining that the light direction is front/back lighting if the difference is not greater than the third reference value.

In the apparatus, if the first luminance determination unit determines that the light direction is side lighting, the light direction determination unit may further include a second luminance comparison unit comparing the first luminance with the second luminance, and a second luminance determination unit determining that the light direction is left-hand side lighting if the first luminance is greater than the second luminance, and determining that the light direction is right-hand side lighting if the first luminance is not greater than the second luminance.

In the apparatus, if the first luminance determination unit determines that the light direction is front/back lighting, the light direction determination unit may further include a third luminance comparison unit comparing the first luminance or the second luminance with a reference luminance, and a third luminance determination unit determining that the light direction is back lighting if the first luminance or the second luminance is not greater than the reference luminance, and determining that the light direction is front lighting if the first luminance or the second luminance is greater than the reference luminance.

In the apparatus, the light direction determination unit may further include a contour derivation unit deriving a contour of the subject, and a back lighting determination unit comparing a contrast of the contour of the subject with a reference contrast, and determining that the light direction is back lighting if the contrast of the contour of the subject is greater than the reference contrast.

The apparatus may further include a luminance derivation unit deriving a luminance of the subject region and a luminance of a background region remaining after excluding the subject region, in which the light direction determination unit may determine whether the light direction is back lighting by analyzing the luminance of the subject region and the luminance of the background region.

In the apparatus, if the light direction determination unit determines that the light direction is side lighting, the region division unit may further divide the subject region into two regions including an upper region and a lower region.

In the apparatus, the histogram generation unit may generate a third histogram for the upper region of the subject region and a fourth histogram for the lower region of the subject region, and the light direction determination unit may determine whether the light direction is one of left-hand front side lighting, right-hand front side lighting, left-hand plane lighting, and right-hand plane lighting by analyzing the third histogram and the fourth histogram.

The apparatus may further include a luminance derivation unit deriving a third luminance for the upper region of the subject region and a fourth luminance for the lower region of the subject region, in which the light direction determination unit may determine whether the light direction is one of left-hand front side lighting, right-hand front side lighting, left-hand plane lighting, and right-hand plane lighting by analyzing the third luminance and the fourth luminance.

In the apparatus, if the first luminance determination unit determines that the light direction is side lighting, the light direction determination unit may further include a peak region derivation unit deriving the number of first peak regions including a first peak in the first histogram and the number of second peak regions including a second peak in the second histogram, and a back lighting determination unit determining that the light direction is cross lighting if the plural first peak regions or the plural second peak regions are distributed in a dark region and a bright region of the first histogram or the second histogram.

In the apparatus, the light direction determination unit may further include, if the number of first peak regions is plural or the number of second peak regions is plural, an average difference calculation unit deriving a first average of the first histogram and a second average of the second histogram, and the back lighting determination unit may compare a difference between the first average and the second average with a fourth reference value and determine that the light direction is cross lighting if the difference between the first average and the second average is greater than the fourth reference value.

In the apparatus, the light direction determination unit may further include, if the number of first peak regions is plural or the number of second peak regions is plural, a luminance difference calculation unit deriving a difference between a first luminance of the left region and a second luminance of the right region, and the back lighting determination unit may compare the difference between the first luminance and the second luminance with a fifth reference value, and determine that the light direction is cross lighting if the difference between the first luminance and the second luminance is greater than the fifth reference value.

In the apparatus, the back lighting determination unit may determine that the light direction is left-hand cross lighting if the plural first peak regions are located in the left side and the right side with respect to a reference gray scale of the first histogram, and determine that the light direction is right-hand cross lighting if the plural second peak regions are located in the left side and the right side with respect to a reference gray scale of the second histogram.

In the apparatus, the region division unit may divide the subject region into four regions including an upper region, a lower region, a left region, and a right region, the histogram generation unit may generate histograms for the four regions, respectively, and the light direction determination unit may determine whether the light direction is one of front lighting, back lighting, left-hand front side lighting, right-hand front side lighting, left-hand plane lighting, right-hand plane lighting, left-hand cross lighting, and right-hand cross lighting by analyzing peak regions including peaks in or averages of the histograms for the four regions.

The apparatus may further include a luminance derivation unit deriving luminances for the four regions, respectively, in which the light direction determination unit may determine whether the light is one of front lighting, back lighting, left-hand front side lighting, right-hand front side lighting, left-hand plane lighting, right-hand plane lighting, left-hand cross lighting, and right-hand cross lighting by analyzing the luminances for the four regions.

BRIEF DESCRIPTION OF THE DRAWINGS

The above and other features and advantages of the invention will become more apparent by describing in detail embodiments of the invention with reference to the attached drawings in which.

DETAILED DESCRIPTION

Hereinafter, embodiments of the invention will be described in detail with reference to the accompanying drawings.

Figure 1:
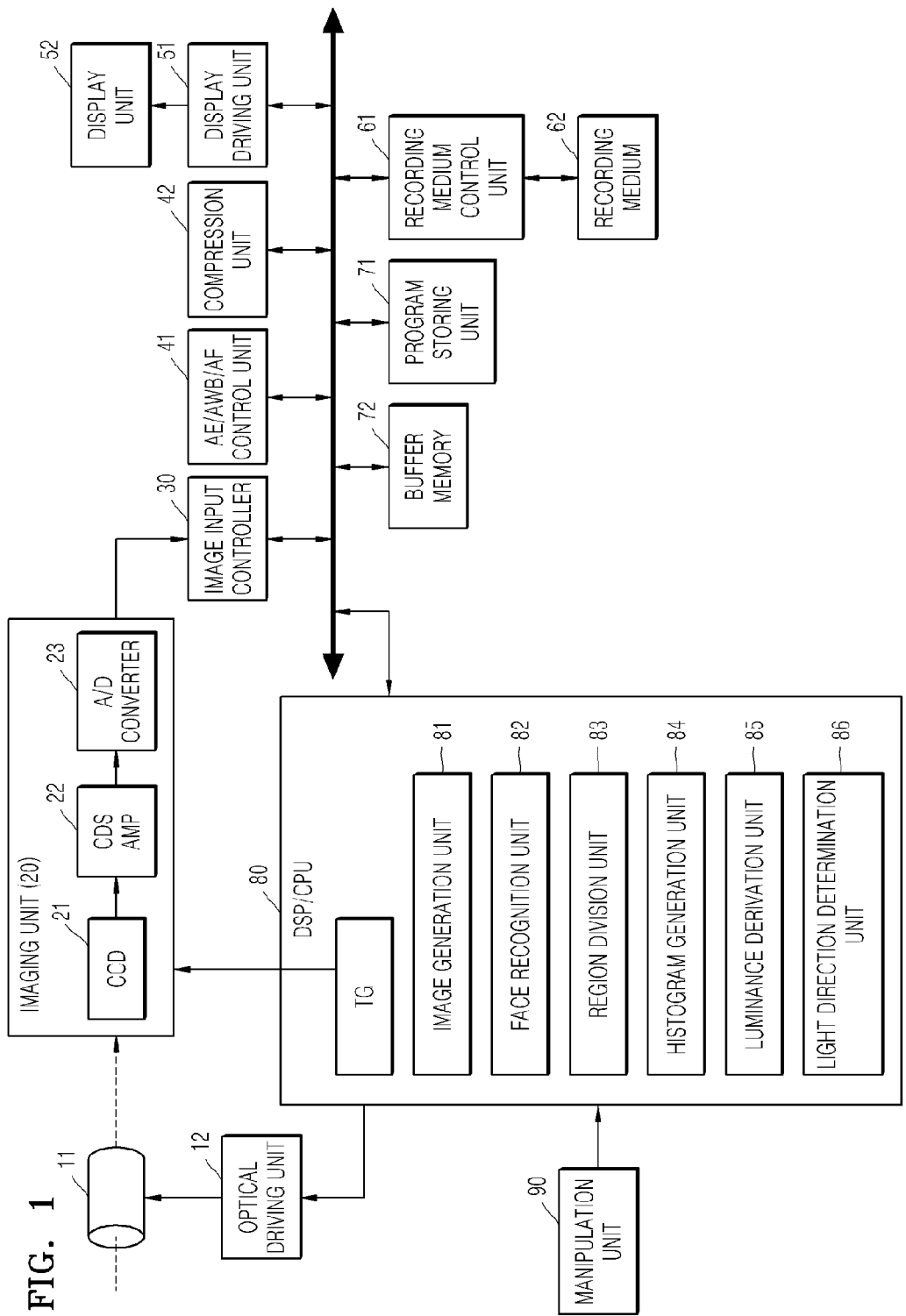
FIG. 1 is a block diagram of an apparatus for processing a digital image signal according to an embodiment of the invention.

FIG. 1 is a block diagram of an apparatus for processing a digital image signal according to an embodiment of the invention. Although a compact digital still camera will be described as an example of an embodiment of the invention, the apparatus and methods can be applied to digital devices such as video cameras, personal digital assistants (PDAs), TVs, digital frames, cellular phones, portable Multimedia players (PMPs), and so forth, without being limited to the compact digital still camera.

The compact digital still camera includes an optical unit 11, an imaging unit 20, an image input controller 30, an auto exposure (AE)/auto white balance (AWB)/auto focus (AF) control unit 41, a compression unit 42, a display unit 52, a recording medium 62, a program storing unit 71, a buffer memory 72, a digital signal processor (DSP)/central processing unit (CPU) 80, and a manipulation unit 90.

The optical unit 11 may include lenses for condensing an optical signal, an iris for adjusting an amount (or light intensity) of the optical signal, and a shutter for controlling input of the optical signal. The lenses may include a zoom lens for reducing or increasing the angle of view according to a focal length and a focus lens for adjusting the focus of a subject. Each of the lenses may be a single lens or a group of a plurality of lenses. The shutter may be a mechanical shutter whose shade moves up and down. Instead of a separate shutter, the shutter function may be implemented by controlling supply of an electric signal to the imaging device 21.

A driving unit 12 for driving the optical unit 11 may control the position of a lens, an opening/closing of the iris, and an operation of the shutter in order to perform operations such as auto focus, auto exposure adjustment, iris adjustment, zoom, and focus change. The driving unit 12 may drive the optical unit 11 according to a control signal provided from the DSP/CPU 80.

The imaging unit 20 is a photoelectric conversion device which receives an optical signal input from the optical unit 11 and converts the optical signal into an electric signal. The imaging unit 20 includes an imaging device 21. In the current embodiment, the imaging device 21 is, but not limited to, a charge coupled device (CCD) sensor array. Another example of the imaging device 21 is a complementary metal oxide semiconductor (CMOS) sensor array.

The imaging unit 20 includes a correlated double sampling (CDS)/amplifying (AMP) unit 22 and an analog-to-digital (A/D) converter 23. The CDS/AMP unit 22 cancels low-frequency noise included in the electric signal output from the imaging device 21 and amplifies the electric signal to have a predetermined level. The A/D converter 23 converts the electric signal output from the CDS/AMP unit 22 to generate a digital signal. The A/D converter 23 outputs the generated digital signal to the image input controller 30.

The imaging unit 20 may be controlled according to a timing signal provided from the DSP/CPU 80. A timing generator (TG) outputs the imaging device 21 or the CDS/AMP unit 22 to control an exposure time of each pixel forming the imaging device 21 or control readout of an electric charge. Consequently, the imaging unit 20 may provide image data corresponding to an image of a frame according to the timing signal provided from the TG.

The AE/AWB/AF control unit 41 calculates an AE evaluation value based on the image data input to the digital still camera, and calculates the aperture of the iris or a shutter speed based on the AE evaluation value. An exposure may be controlled by an exposure time, a gain, and a readout mode of the imaging device 21. The gain is used to calculate a contrast value. The readout mode of the imaging device 21 is a signal processing mode, for example, when the imaging device 21 reads out image data. In the readout mode, the imaging device 21 may add a pixel when a subject is dark and may remove pixels when the subject is bright. An AWB control may be performed, for example, by calculating gains of primary colors based on an AWB evaluation value calculated from the image data. An AF control may be performed by calculating an in-focus position of a focus lens based on an AF evaluation value. The AF evaluation value may be calculated based on a luminance value of the image data. For example, according to a contrast detection scheme, the AF evaluation value is a contrast value of an image signal and it is determined that a subject image is in focus on an imaging plane of the imaging device 21 when the contrast value is a peak value. Upon receiving a focus control start manipulation signal, the AE/AWB/AF control unit 41 generates a control signal for moving the focus lens in a single direction and outputs the generated control signal to a focus lens driver. The AF control may include first driving of the focus lens for determining a main subject image and second driving of the focus lens for detecting an in-focus position by driving only a range including the peak value of the contrast value corresponding to the main subject image determined during the first driving. In the AF control, the in-focus position obtained by the calculation is output to the focus lens driver as a control signal. The focus lens driver generates a driving signal based on the control signal provided by the AE/AWB/AF control unit 41, and drives the focus lens according to the driving signal.

The compression unit 42 receives an image signal in a before-compression state and compresses the image signal into a format such as a JPEG compression format or an LZW compression format. The compression unit 42 may transmit compression image data generated by the compression to, for example, the recording medium 62 for storage thereon.

A display driving unit 51 drives the display unit 52 to display various setting screens or an image corresponding to image data generated by photographing. The image data may be implemented with an image recorded on the recording medium 62, or may be provided in real time from the buffer memory 72. The display unit 52 may be a display device such as a liquid crystal display (LCD), an organic light emitting diode (OLED), a plasma display panel (PDP), or an electrophoresis display (EPD).

A recording medium control unit 61 controls a write operation of image data to the recording medium 62 or a read operation of image data or setup information recorded on the recording medium 62. The recording medium 62 may be, for example, an optical disc such as a compact disc (CD), a digital versatile disc (DVD), blue ray disc, an optical magnetic disk, a magnetic disk, a semiconductor storage medium, or the like, to record photographed image data. The recording medium control unit 61 and the recording medium 62 may be detached from the digital still camera.

The program storing unit 71 may store an operating system (OS) and application programs necessary for operating the digital still camera. The program storing unit 71 may be an electrically erasable programmable read-only memory (E2PROM), a flash memory, or a read only memory (ROM).

The buffer memory 72 temporarily stores image data of a photographed image. The buffer memory 72 may store image data of several images and hold image signals in order during focus control to output an image signal. Read and write operations of an image with respect to the buffer memory 72 can be controlled by the image input controller 30. The buffer memory 72 may include an image display memory having several channels. Input of image data to the image display memory and output of image data to the display driving unit 61 may be performed at the same time. The resolution or maximum number of color developments of the display unit 52 depends on the capacity of the image display memory.

The DSP/CPU 80 is an operation processing and controlling device based on a program, and controls processing of each component installed in the digital still camera. The DSP/CPU 80 outputs a control signal to the optical driving unit 12 to drive the optical unit 11 based on focus control or exposure control. The DSP/CPU 80 controls each component of the digital still camera based on a signal provided from the manipulation unit 90. Although the DSP/CPU 80 is implemented as a single device in the current embodiment, it may also be implemented with several CPUs for executing a command of a signal system and a command of a manipulation system, respectively.

The DSP/CPU 80 may include an image generation unit 81 which generates an image including a face, a face recognition unit 82 which recognizes the face from the image and forms a facial region, a region division unit 83 which divides the facial region into at least two regions, a histogram generation unit 84 which generates histograms for the two regions, respectively, and a light direction determination unit 86 which determines whether the light direction is side lighting, by analyzing the histograms for the two regions. The DSP/CPU 80 may further include a luminance derivation unit 85 which derives a luminance from image data of the divided image.

Although a face is used as an example of a subject in the current embodiment, the invention is not limited thereto. While not shown in the figures, in an apparatus for processing a digital image signal according to another embodiment of the invention, a DSP/CPU unit may generate an image including a subject, form a subject region by recognizing the subject, divide the subject region into at least two regions, and generate histograms for the respective regions.

Continuing to refer to FIG. 1, the image generation unit 81 reduces noise for input image data and performs image signal processing such as gamma correction, color filter array interpolation, color matrix, color correction, and color enhancement. The image generation unit 81 may perform aforementioned image signal processing to generate an image including a face from image data input by photographing of a subject.

The face recognition unit 82 recognizes a facial region from the image according to a face recognition algorithm, and detects the facial region.

The region division unit 83 divides the facial region into two regions, i.e., a left region and a right region. However, such division is only an example, and the region division unit 83 may divide the facial region into four regions, upper, lower, left, and right regions, or more than four regions. In the invention, a light direction is determined by analyzing a histogram for an image of each of the regions. For the light direction determination, the facial region is divided into at least two regions.

The histogram generation unit 84 may derive a histogram for an image of each divided region. The histogram generation unit 84 may generate a histogram showing a frequency with respect to a gray scale by converting RGB data of the image into Y data. If the image is divided into two regions, a left region and a right region, the histogram generation unit 84 may generate a first histogram for an image of the left region and a second histogram for an image of the right region.

The light direction determination unit 86 may determine whether the light direction is side lighting, by using the generated histograms. For example, the light direction determination unit 86 may compare a distribution of the first histogram of the left region with a distribution of the second histogram of the right region and determine that the light illuminates the region having a high frequency for a high gray scale.

More specifically, it can be determined that the light direction is side lighting if a gray scale difference between the first histogram of the left region and the second histogram of the right region is larger than a predetermined reference value. A gray scale difference between histograms for images of divided regions may be derived by using a difference between frequencies of peak regions, a difference between averages of the peak regions, or a difference between overall averages. The peak region means a peak or a region including the peak.

The DSP/CPU 80 may further include the luminance derivation unit 85 which may derive a luminance LV from the RGB data. The light direction determination unit 86 determines whether the light direction is side lighting, by using the derived luminance LV. In the current embodiment, the luminance LV may be used as an auxiliary means in addition to a histogram. For example, when it is determined whether the light direction is side lighting, by using histograms, it may be further determined whether the light direction is side lighting, by comparing a difference between a first luminance LV of the left region and a second luminance LV of the right region with a predetermined reference value. This process will be later described in more detail.

The manipulation unit 90 may include a member for allowing a user to perform various setup operations during manipulation of the digital still camera or photographing. For example, the member may be implemented as a button, a key, a touch panel, a touch screen, or a dial, and may receive a user manipulation signal such as power on/off, photographing start/stop, playback start/stop/search, driving of an optical system, mode switching, menu manipulation, and selection manipulation. For example, the shutter button may be semi-pressed, full-pressed, or released by the user. The shutter button outputs a focus control start manipulation signal when being semi-pressed (S1 manipulation), and terminates focus control when being semi-press-released. The shutter button outputs a photographing start manipulation signal when being full-pressed (S2 manipulation). The manipulation signals are transmitted to the DSP/CPU 80 to drive corresponding components.

In the following embodiments, the light direction determination unit in the compact digital still camera shown in FIG. 1 according to embodiments of the invention will be described with reference to FIGS. 2 through 6. In the embodiments shown in FIGS. 2 through 6, a facial region is detected as a subject region, the facial region is divided into a left region and a right region located to the left and to the right with respect to a central line, respectively, and a first histogram for an image of the left region and a second histogram for an image of the right region are generated.

Figure 2:
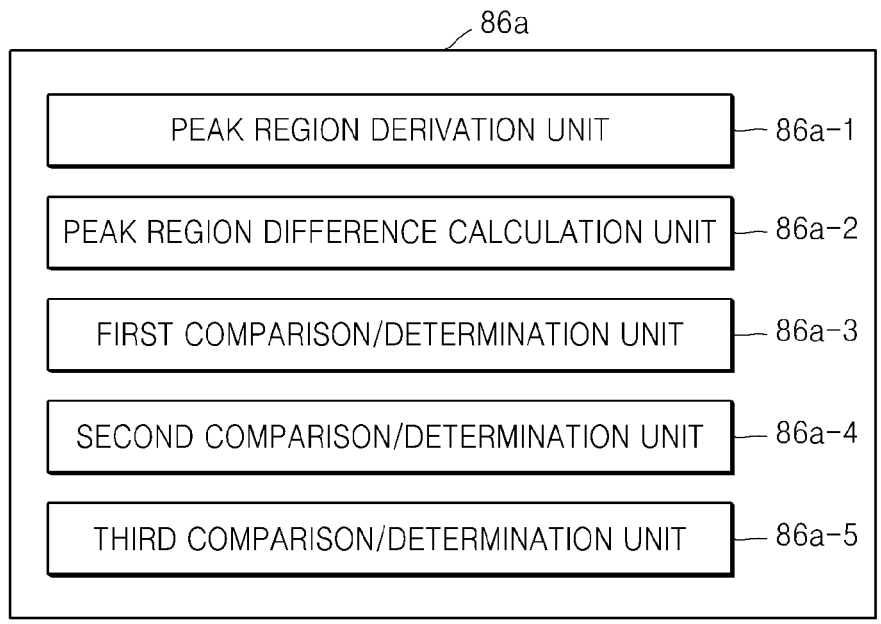
FIG. 2 is a block diagram of a light direction determination unit in the apparatus shown in FIG. 1, according to an embodiment of the invention.

Referring to FIG. 2, a light direction determination unit 86a according to an embodiment of the invention includes a peak region derivation unit 86a-1, a peak region difference calculation unit 86a-2, a first comparison/determination unit 86a-3, a second comparison/determination unit 86a-4, and a third comparison/determination unit 86a-5.

The peak region derivation unit 86a-1 derives a first peak region which is a region including a first peak indicating a maximum value of a frequency in the first histogram and a second peak region which is a region including a second peak in the second histogram. The region may be preset by deriving the first peak or the second peak and setting a predetermined range to the left or to the right from the first peak or the second peak as the first peak region or the second peak region. The peak region includes at least a peak, such that it may be the first peak or the second peak itself.

The peak region difference calculation unit 86a-2 derives a difference between gray scales of the first peak region and gray scales of the second peak region. To this end, the peak region difference calculation unit 86a-2 may derive a difference between a gray scale sum of or an average of the first peak region and a gray scale sum of or an average of the second peak region. Alternatively, the peak region difference calculation unit 86a-2 may calculate a difference between a gray scale of the first peak and a gray scale of the second peak.

The first comparison/determination unit 86a-3 compares a difference between the first peak region and the second peak region with a predetermined first reference value, and determines that the light direction is side lighting if the difference is greater than the first reference value; otherwise, the first comparison/determination unit 86a-3 determines that the light direction is front/back lighting. In a histogram showing gray scales ranging from 0 to 255, the first reference value may be set to 50.

If the first comparison/determination unit 86a-3 determines that the light direction is side lighting, the second comparison/determination unit 86a-4 compares the gray scales of the first peak region with the gray scales of the second peak region. The second comparison/determination unit 86a-4 determines that the light direction is left-hand side lighting if the gray scales of the first peak region are greater than those of the second peak region; otherwise, second comparison/determination unit 86a-4 determines that the light direction is right-hand side lighting.

If the first comparison/determination unit 86a-3 determines that the light direction is front/back lighting, the third comparison/determination unit 86a-5 compares the gray scales of the first peak region and/or the gray scales of the second peak region with a first reference gray scale. The third comparison/determination unit 86a-5 determines that the light direction is back lighting if the first peak region and the second peak region are located in a region having gray scales being less than the first reference gray scale, and determines that the light direction is front lighting if they are located in a region having gray scales exceeding the first reference gray scale. In case of gray scales of 0 to 255, the first reference gray scale may be empirically preset to 127.

Figure 3:
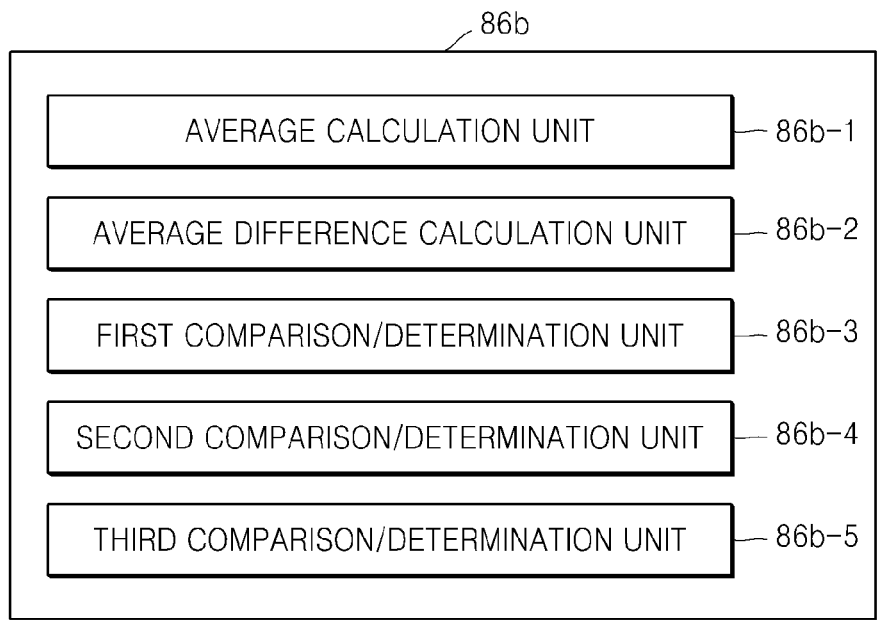
FIG. 3 is a block diagram of a light direction determination unit in the apparatus shown in FIG. 1, according to another embodiment of the invention.

The light direction determination unit according to another embodiment will be described with reference to FIG. 3. A light direction determination unit 86b according to the current embodiment includes an average calculation unit 86b-1 which derives a first average of the first histogram and a second average of the second histogram, an average difference calculation unit 86b-2 which derives a difference between the first average and the second average, and a first comparison/determination unit 86b-3 which determines whether the light direction is side lighting or front/back lighting, by comparing the difference with a predetermined second reference value. The first comparison/determination unit 86b-3 determines that the light direction is side lighting if the difference is greater than the second reference value; otherwise, the first comparison/determination unit 86b-3 determines that the light direction is front/back lighting. In case of a histogram showing gray scales of 0 to 255, the second reference value may be set to 50.

If the first comparison/determination unit 86b-3 determines that the light direction is side lighting, a second comparison/determination unit 86b-4 compares the first average with the second average. The second comparison/determination unit 86b-4 determines that the light direction is left-hand side lighting if the first average is greater than the second average; otherwise, and the second comparison/determination unit 86b-4 determines that the light direction is right-hand side lighting.

If the first comparison/determination unit 86b-3 determines that the light direction is front/back lighting, a third comparison/determination unit 86b-5 compares the first average and/or the second average with a second reference gray scale. The third comparison/determination unit 86b-5 determines that the light direction is back lighting if the first average and/or the second average are located in a region having gray scales being less than the second reference gray scale, and determines that the light direction is front lighting if they are located in a region having gray scales exceeding the second reference gray scale. The second reference gray scale may also be set to 127.

Figure 4:
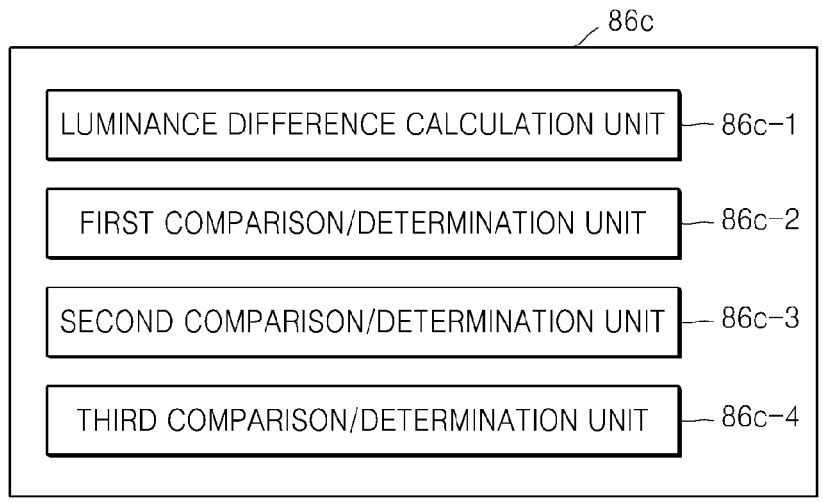
FIG. 4 is a block diagram of a light direction determination unit in the apparatus shown in FIG. 1, according to still another embodiment of the invention.

A description will be made of a light direction determination unit 86c according to still another embodiment with reference to FIG. 4. Referring to FIG. 4, the light direction determination unit 86c may include a luminance difference calculation unit 86c-1, a first luminance comparison/determination unit 86c-2, a second luminance comparison/determination unit 86c-3, and a third luminance comparison/determination unit 86c-4. In the current embodiment, it is presumed that the DSP/CPU 80 shown in FIG. 1 includes the luminance derivation unit 85. The luminance derivation unit 85 derives the first luminance LV for an image of the left region and the second luminance LV for an image of the right region.

The light direction determination unit 86c derives a difference between the first luminance and the second luminance. The first luminance comparison/determination unit 86c-2 determines that the light direction is side lighting if the difference between the first luminance and the second luminance is greater than a predetermined third reference value; otherwise, the first luminance comparison/determination unit 86c-2 determines that the light direction is front/back lighting. If the first luminance comparison/determination unit 86c-2 determines that the light direction is side lighting, the second comparison/determination unit 86c-3 determines that the light direction is left-hand side lighting if the first luminance is greater than the second luminance; otherwise, the second comparison/determination unit 86c-3 determines that the light direction is right-hand side lighting. The third comparison/determination unit 86c-4 determines that the light direction is back lighting if the first luminance and/or the second luminance are less than a reference luminance; otherwise, the third comparison/determination unit 86c-4 determines that the light direction is front lighting.

In the current embodiment, the determination with luminance comparison may be made through two stages. For example, side lighting or front/back lighting, and left-hand side lighting or right-hand side lighting and front lighting or back lighting are determined primarily by using histograms, followed by secondary determination with luminance comparison, thereby determining a light direction if the result of the secondary determination is identical to the result of the primary determination and determining an error if they are not identical to each other. In this way, the reliability of determination of a light direction can be improved.

Figure 5:
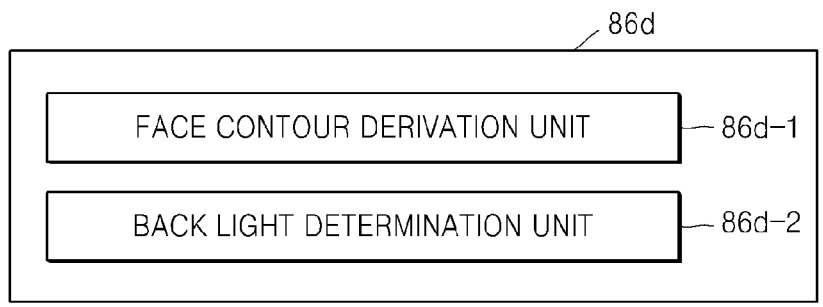
FIG. 5 is a block diagram of a light direction determination unit in the apparatus shown in FIG. 1, according to yet another embodiment of the invention.

In case of front/back lighting, determination regarding back lighting will be described with reference to FIG. 5. The light direction determination unit 86d shown in FIG. 5 includes a face contour derivation unit 86d-1 which derives a contour region of the face recognized by the face recognition unit 82, and a back lighting determination unit 86d-2 which compares a contrast of the face contour region with a reference contrast and determines that the light direction is back lighting if the contrast of the face contour region is greater than the reference contrast. In case of back lighting condition, a contrast of a contour of a subject, for example, a contrast of a contour region of a face is high. In the embodiments shown in FIGS. 2 through 4, the third comparison/determination units 86a-5 and 86b-5 or the third luminance comparison/determination unit 86c-4 may be substituted by a structure for determining front/back lighting, or back lighting may be secondarily determined in addition to primary front/back light determination performed by the third comparison/determination units 86a-5 and 86b-5 or the third luminance comparison/determination unit 86c-4. That is, if the primary determination and the secondary determination show the same result, back lighting or front lighting, it is determined that the result is a direction of light. If the results of the primary determination and the secondary determination are not identical to each other, it is determined that an error occurs.

Although not shown in the figures, it may be determined whether the light direction is back lighting, by comparing a histogram or/and a luminance of the facial region with a histogram or/and a luminance of a background region remaining after excluding the facial region. In the above-described example for determining a light direction by comparing the histogram or/and the luminance of the image of the left region with the histogram or/and the luminance of the image of the right region, it may be determined that the light direction is front lighting if gray scales of the facial region in place of the left region are greater than those of the background region in place of the right region; otherwise, it may be determined that the light direction is back lighting. The luminance derivation unit 85 derives a luminance of the facial region and a luminance of the background region, and the light direction determination unit 86 determines that the light direction is front lighting if the luminance of the facial region is greater than that of the background region; otherwise, the light direction determination unit 86 determines that the light direction is back lighting. Similarly with the embodiment shown in FIG. 5, back lighting determination may be performed thirdly in addition to the secondary determination or back lighting determination shown in FIG. 5.

Although not shown in the figures, in case of side lighting, the region division unit 83 may divide the facial region into two regions, an upper region and a lower region, for use in determining whether the light direction is plane lighting. The histogram generation unit 84 may generate a third histogram for the upper region of the subject region and a fourth histogram for the lower region of the subject region. The light direction determination unit 86 determines whether the light direction is one of left-hand front side lighting, right-hand front side lighting, left-hand plane lighting, and right-hand plane lighting, by analyzing the third histogram and the fourth histogram. The analysis of the third histogram and the fourth histogram may be performed in the same manner as the analysis of the histogram and the second histogram. For example, a peak region of the third histogram and a peak region of the fourth histogram are derived, and it may be determined that the light direction is plane lighting if a difference between the peak regions is greater than a predetermined reference value; otherwise, it may be determined that the light direction is the front side light. Herein, plane lighting includes a left-hand top side light, a left-hand bottom side light, a right-hand top side light, and a right-hand bottom side light. Therefore, it is determined whether the light direction is left-hand side lighting or right-hand side lighting, by analyzing the first histogram and the second histogram, and then it is determined whether the light direction is one of left-hand front side lighting, right-hand front side lighting, left-hand plane lighting, and right-hand plane lighting, by analyzing the third histogram and the fourth histogram. Alternatively, after it is determined whether the light direction is left-hand side lighting or right-hand side lighting, by analyzing the first histogram and the second histogram, the luminance derivation unit 85 derives a third luminance LV for the upper region of the subject region and a fourth luminance LV for the lower region of the subject region. A difference between the third luminance and the fourth luminance is compared with a predetermined reference value, such that it is determined that the light direction is left-hand plane lighting or right-hand plane lighting if the difference is greater than the predetermined reference value; otherwise, it is determined that the light direction is left-hand front side lighting or right-hand front side lighting. The further determination regarding side lighting by using luminances may be used as an auxiliary means for determination using histograms.

Figure 6:
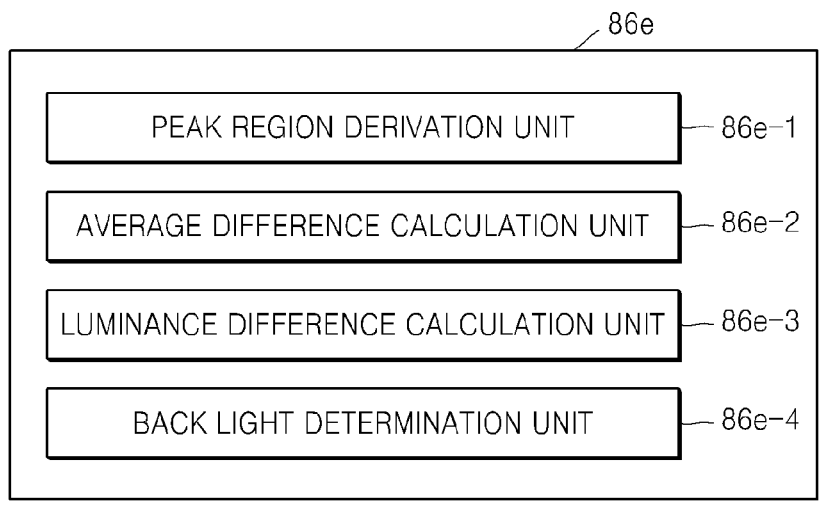
FIG. 6 is a block diagram of a light direction determination unit in the apparatus shown in FIG. 1, according to yet another embodiment of the invention.

In case of side lighting, it may be further determined whether the light direction is cross lighting, as well as plane lighting, as will be described with reference to a light direction determination unit 86e shown in FIG. 6.

The light direction determination unit 86e according to the current embodiment may include a peak region derivation unit 86e-1 and a cross lighting determination unit 86e-4.

The peak region derivation unit 86e-1 derives the number of first peak regions including a first peak in the first histogram and the number of second peak regions including a second peak. Since the solar light (or artificial light) is behind the side and thus the solar light (or artificial light) is reflected around the edge of the side of the face, a dark portion and a bright portion coexist in the histogram of the side region. Therefore, the cross lighting determination unit 86e-4 may determine that the light direction is cross lighting if there are plural first peak regions and the first peak regions are located in the dark region and the bright region, respectively. Alternatively, the cross lighting determination unit 86e-4 may determine that the light direction is cross lighting, if the number of second peak regions is plural and the second peak regions are located in the dark region and the bright region, respectively. More specifically, a case where plural first peak regions or plural second peak regions are located in the left side and the right side with respect to a reference gray scale may be determined as a case where they are located in the dark region and the bright region, respectively. In case of gray scales of 0 to 255, the reference gray scale may be set to 127.

The light direction determination unit 86e may further include an average difference calculation unit 86e-2. If the number of first peak regions or second peak regions derived from the peak region derivation unit 86e-1 is plural, the average difference calculation unit 86e-2 derives a difference between a first average of the first histogram and a second average of the second histogram. If the number of first peak regions or second peak regions is plural, and the first peak regions or the second peak regions are located in a region having low gray scales and a region having high gray scales, respectively, the cross lighting determination unit 86e-4 compares the difference between the first average and the second average with a fourth reference value, and determines that the light direction is cross lighting if the difference is greater than the fourth reference value; otherwise, the cross lighting determination unit 86e-4 determines that the light direction is side lighting.

In another embodiment for determining whether the light direction is cross lighting, if the number of first peak regions or second peak regions derived from the peak region derivation unit 86e-1 is plural, and the first peak regions or the second peak regions are located in a region having low gray scales and a region having high gray scales, respectively, a luminance difference calculation unit 86e-3 may calculate a difference between the first luminance LV of the left region of the facial region and the second luminance LV of the right region of the facial region. The cross lighting determination unit 86e-4 compares the difference between the first luminance and the second luminance with a fifth reference value and determines that the light direction is cross lighting if the difference is greater than the fifth reference value; otherwise, the cross lighting determination unit 86*e*-4 determines that the light direction is side lighting. The cross lighting determination using luminances may be used as an auxiliary means for determination using histograms.

In another embodiment of the invention, the region division unit 83 shown in FIG. 1 may initially divide the facial region, which is the subject region, into 4 regions, top, bottom, left, and right regions. The histogram generation unit 84 may generate histograms for the four regions. The light direction determination unit 86 may determine whether the light direction is front lighting, back lighting, left-hand front side lighting, right-hand front side lighting, left-hand plane lighting, right-hand plane lighting, left-hand cross lighting, or right-hand cross lighting, by using a peak region including a peak or an average in each of the histograms for the four regions. As an auxiliary means, the luminance derivation unit 85 may derive a luminance for each of the four regions, and further determine a light direction mentioned above by using the derived luminance. If a light direction determined using histograms and a light direction determined using luminances are identical to each other, the identical light direction is finally determined; otherwise, it is determined that an error occurs. The determined light direction may be indicated to a user by being displayed on the display unit 52 in the form of an icon. Alternatively, the determined light direction may be indicated to the user through a speaker, or image quality processing may be performed according to the determined light direction.

In the following description, a method of processing a digital image signal according to embodiments of the invention will be described.

First, a method of processing a digital image signal according to an embodiment of the invention will be described with reference to FIG. 7. In the current embodiment, a face is used as an example of a subject.

Figure 7:
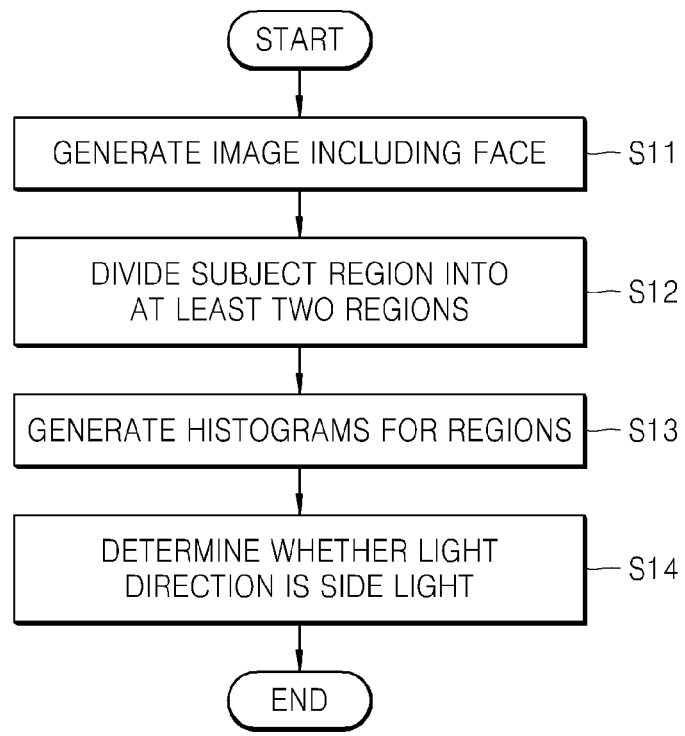
FIG. 7 is a flowchart of a method of processing a digital image signal according to an embodiment of the invention.

Referring to FIG. 7, an image of a facial region including a face is generated in operation S11. The image including the face may be generated by photographing a face subject. In a live-view mode, the image is generated and displayed on the display unit.

In operation S12, the facial region is generated from the image by using a face recognition algorithm, and the facial region is divided into at least two regions. For example, the facial region may be divided into a left region and a right region located to the left and to the right with respect to a line running vertically through the center of the facial region.

In operation S13, a histogram is generated for each of the at least two regions. For example, a first histogram is generated for the left region and a second histogram may be generated for the right region.

In step S14, it may be determined whether the light direction is side lighting by analyzing distributions of the histograms. For example, if a gray scale difference is greater than a reference value as a result of analyzing the distribution of the first histogram and the distribution of the second histogram, it may be determined that the light direction is side lighting.

Figure 8:
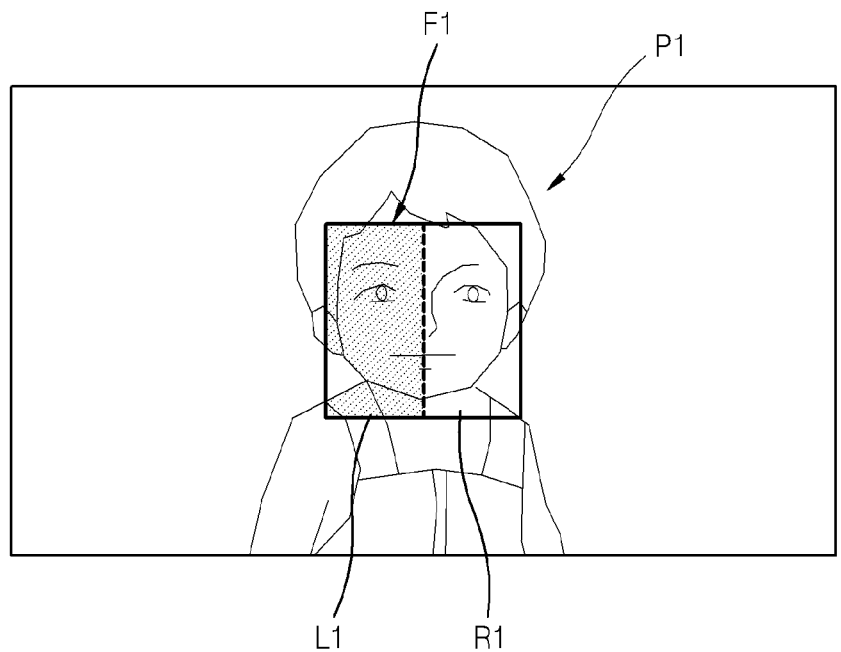
FIG. 8 illustrates an image including a subject illuminated with right-hand side lighting.

FIG. 8 illustrates an image including a subject illuminated with right-hand side lighting.

Referring to FIG. 8, a facial region F1 is derived from an image including a person subject P1 and the facial region F1 is divided into a left region L1 and a right region R1. According to the image shown in FIG. 8, the solar light (or artificial light) is illuminated to the subject P1 from the right side, whereby the left region L1 is relatively dark and the right region R1 is relatively bright.

Figure 9A:
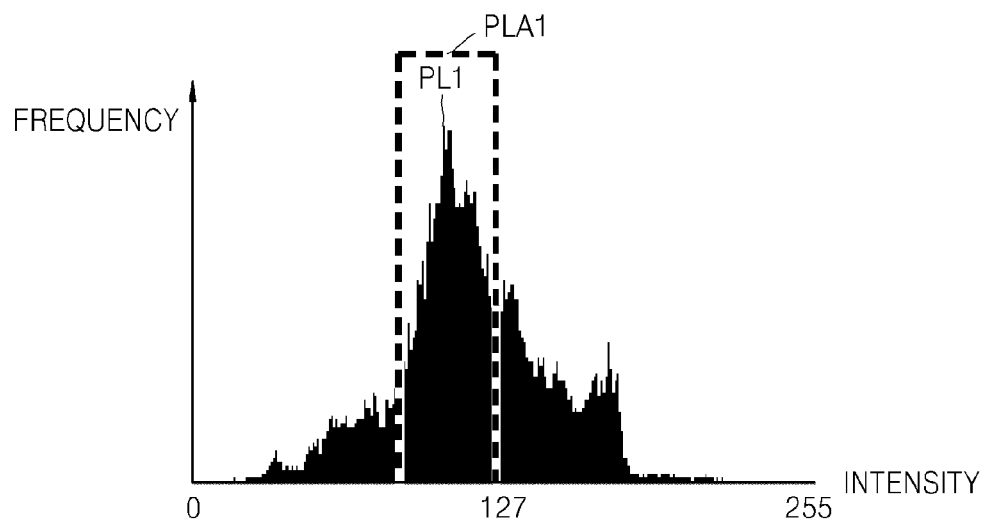
FIGS. 9A and 9B show histograms of a left region and a right region of a subject region in the image illustrated in FIG. 8.
Figure 9B:
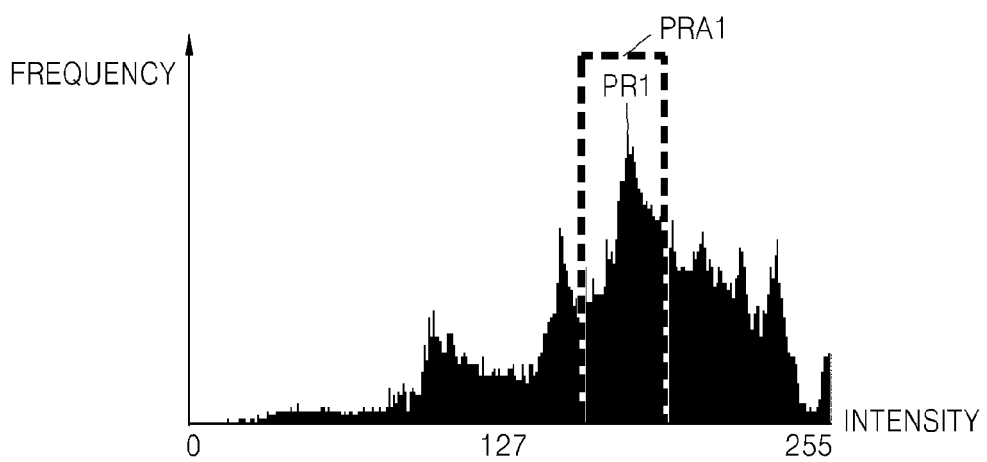

FIGS. 9A and 9B show the first histogram for the left region L1 of the subject region of the image shown in FIG. 8, that is, the facial region F1, and the second histogram for the right region R1 of the facial region F1. In the first histogram and the second histogram shown in FIGS. 9A and 9B, a gray scale intensity is plotted on the x axis from 0 to 255 and a frequency corresponding to a gray scale is plotted on the y axis.

It can be seen from comparative analysis of the first histogram and the second histogram shown in FIGS. 9A and 9B that the first histogram has lower gray scale values than the second histogram as a whole. To be more specific, a first average of the first histogram is 111 and a second average of the second histogram is 174. Consequently, the first average of the first histogram is less than the second average of the second histogram, from which it can be seen that the left region L1 is darker than the right region R1 and thus the light direction is left-hand side lighting.

In another way to determine whether the light direction is side lighting, a first peak region PLA1 including a first peak PL1 is derived from the first histogram of the left region L1 shown in FIG. 9A, and a second peak region PR1 including a second peak PR1 is derived from the second histogram of the right region R1 shown in FIG. 9B. A difference between a gray scale sum of or an average of the first peak region PLA1 and a gray scale sum of or an average of the second peak region PRA1 and compares the difference with a predetermined reference value. For example, for a reference value of 50, if the difference is less than 50, it means that the gray scale difference between the left region L1 and the right region R1 is relatively small and thus it is determined that the light direction is not side lighting; otherwise, it is determined that the light direction is side lighting. In this case, it may be determined that the solar light (or artificial light) is irradiated to a region having high gray scales. For example, it may be determined that the light direction is left-hand side lighting or right-hand side lighting.

Alternatively, it may be determined whether the light direction is side lighting by comparing a gray scale of the first peak PL1 with that of the second peak PR1, or by using a gray scale sum of the first histogram and the second histogram.

Figure 10:
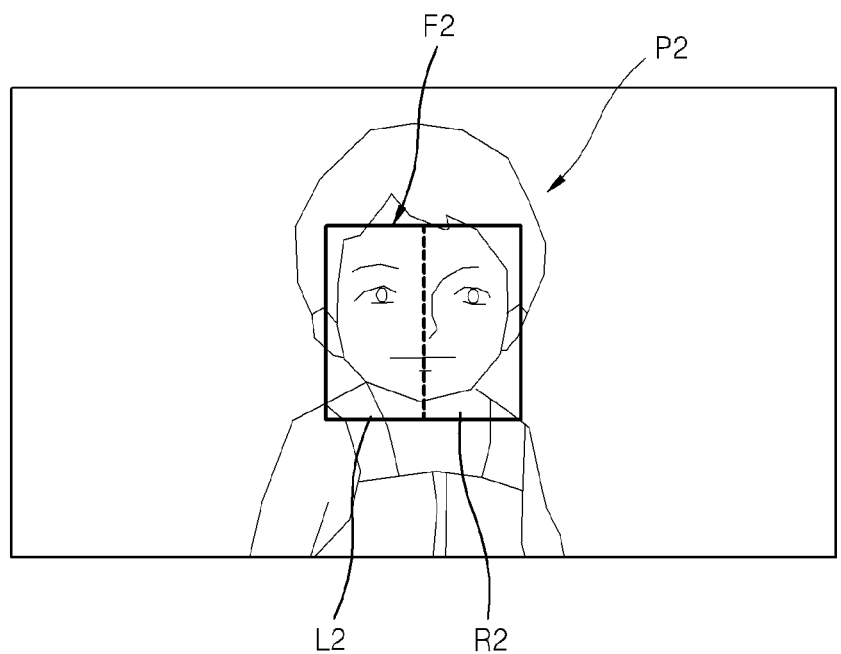
FIG. 10 illustrates an image including a subject illuminated with front lighting.

FIG. 10 illustrates an image including a subject illuminated with front lighting.

Referring to FIG. 10, a facial region F2 is derived from the image including a person subject P2, and the facial region F2 is divided into a left region L2 and a right region R2. Referring to the image shown in FIG. 10, the solar light (or artificial light) is irradiated to the subject P2 in front of the subject P2 and thus both the left region L2 and the right region R2 are bright at the same level.

Figure 11A:
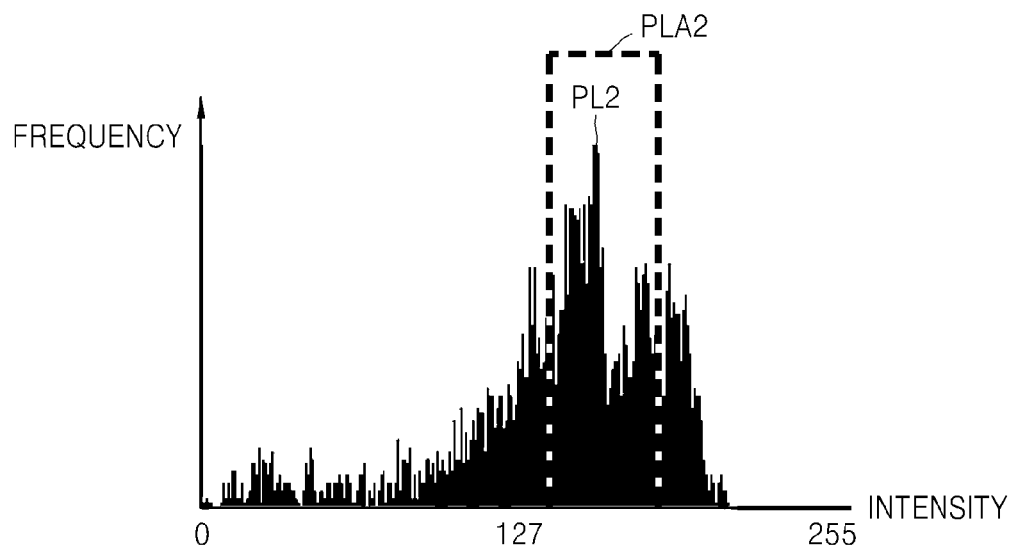
FIGS. 11A and 11B show histograms of a left region and a right region of a subject region in the image illustrated in FIG. 10.
Figure 11B:
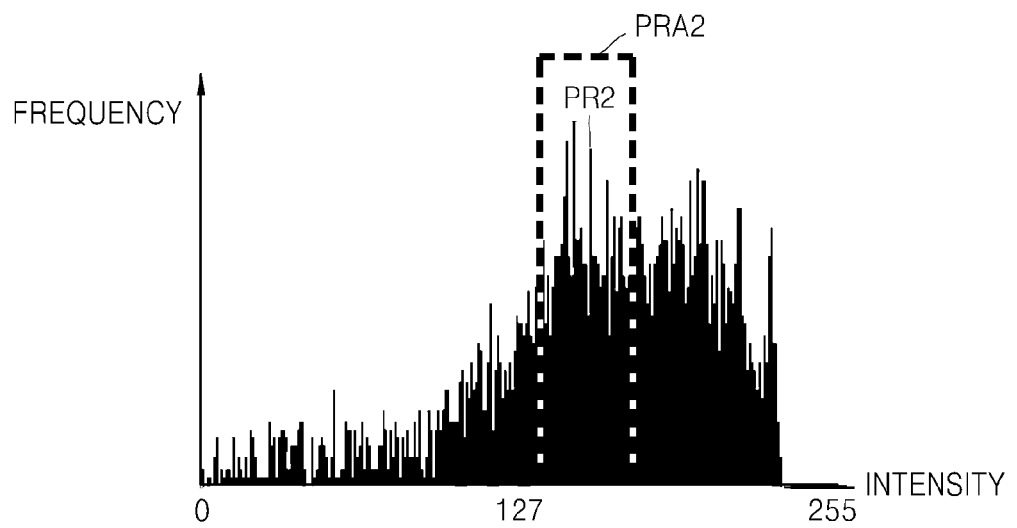

Histograms for the left region L2 and the right region R2 are as shown in FIGS. 11A and 11B, respectively. FIG. 11A is a graph showing a first histogram for the left region L2, and FIG. 11B is a graph showing a second histogram for the right region R2. The first histogram and the second histogram show similar distributions. More specifically, a first average of the first histogram is 140 and a second average of the second histogram is 150. Consequently, a difference between the first average and the second average is less than a predetermined reference value of 50, from which it may be determined that the light direction is side lighting. That is, it may be determined that the light direction is front/back lighting.

It can also be seen that both the first average of the first histogram and the second average of the second histogram exceed the reference gray scale of 127. Therefore, the left region L2 of the facial region F2 is brighter than the right region R2 of the facial region F2, from which it may be determined that the solar light (or an artificial light) is irradiated to the subject in front of the subject as front lighting.

In another way, it may be possible to derive a first peak PL2 of the first histogram and a second peak PR2 of the second histogram, derive a gray scale difference between the first peak PL2 and the second peak PR2, and determine that the light direction is not side lighting if the difference exceeds the reference value; otherwise, determine that the light direction is side lighting. In the current embodiment, the difference is less than the reference value, and thus it may be determined that the light direction is not side lighting. Moreover, the first peak PL2 and the second peak PR2 are located in regions having higher gray scales than a middle gray scale of 125 between 0 to 255, whereby the left region L2 and the right region R2 are bright and thus it may be determined that the light direction is front lighting, rather than back lighting.

In still another way, a first peak region PLA2 including the first peak PL2 and a second peak region PRA2 including the second peak PR2 are derived and it is determined whether the light direction is side lighting, by using a gray scale sum of or an average of the first peak region PLA2 and a gray scale sum of or an average of the second peak region PRA2.

Figure 12:
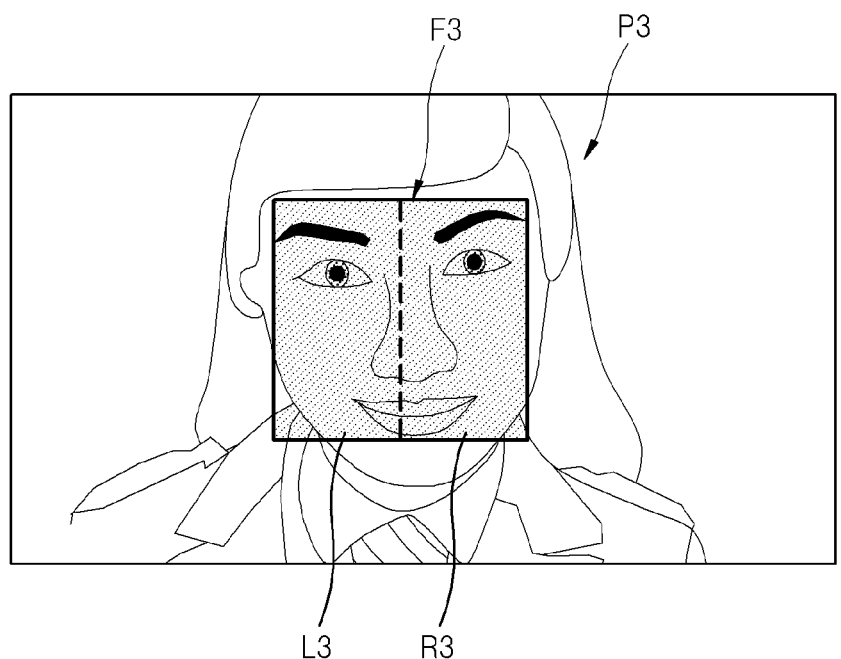
FIG. 12 illustrates an image including a subject illuminated with back lighting.

FIG. 12 illustrates an image of a subject P3 illuminated with back lighting. A facial region F3 is formed from the subject P3 by using a face recognition algorithm, and a left region L3 and a right region R3 of the facial region F3 are derived.

Figure 13A:
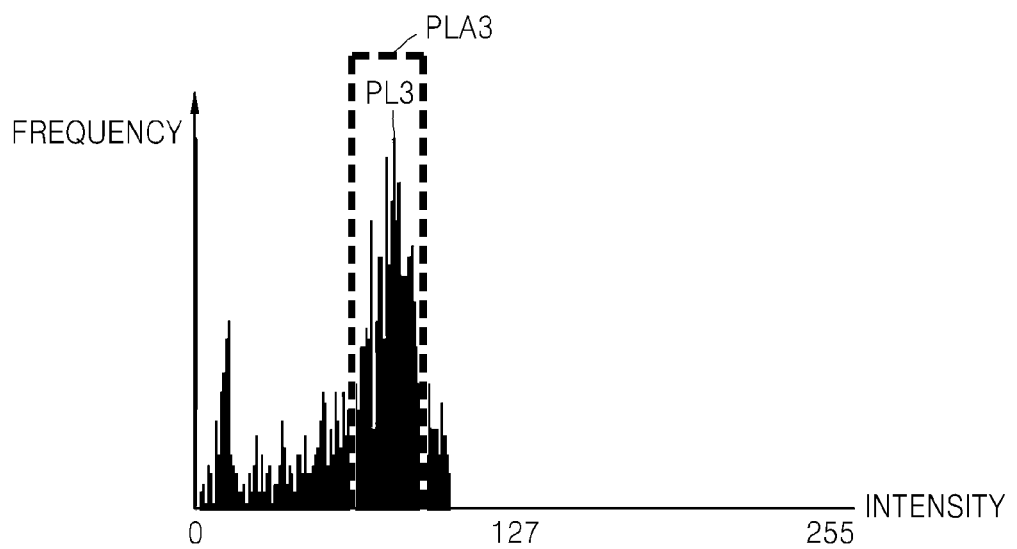
FIGS. 13A and 13B show histograms of a left region and a right region of a subject region in the image illustrated in FIG. 12.
Figure 13B:
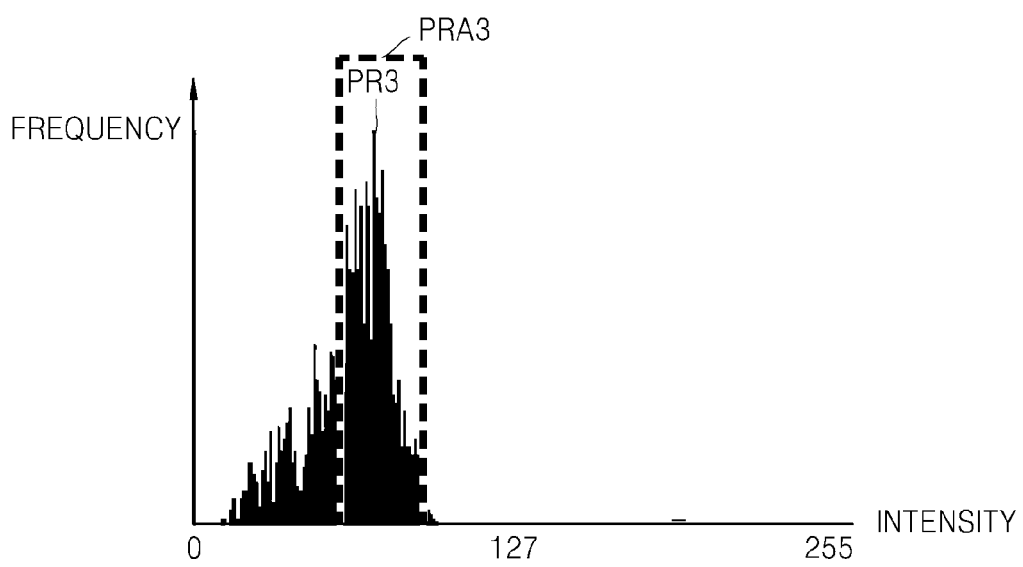

A first histogram for the left region L3 is generated as shown in FIG. 13A, and a second histogram for the right region R3 is generated as shown in FIG. 13B.

The comparative analysis of the first histogram shown in FIG. 13A and the second histogram shown in FIG. 13B shows that the first histogram and the second histogram are similar to each other in a dark region having low gray scales. Therefore, it may be determined that the light direction is not side lighting, but back lighting because the first histogram and the second histogram are located in a dark region.

More specifically, a first average of the first histogram is 62 and a second average of the second histogram is 55. A difference between the first average and the second average is 7 which is less than 50. Consequently, it may be determined that the light direction is not side lighting, but front/back lighting. In addition, because both of the first average and the second average are less than a reference gray scale of 127, it may be determined that the light direction is back lighting.

In another way, a first peak PL3 is derived from the first histogram and a second peak PR3 is derived from the second histogram. By comparing a gray scale of the first peak PL3 with that of the second peak PR3, it can be determined that the light direction is not side lighting because a difference between the gray scales is less than 50 which is a predetermined reference value. In addition, both the first peak PL3 and the second peak PR3 are located below 127, from which it may be determined that the light direction is back lighting.

In still another way, a first peak region PLA3 including the first peak PL3 and a second peak region PRA3 including the second peak PR3 are derived, and a gray scale sum of or an average of the first peak region PLA3 is compared with that of the second peak region PRA3 to determine whether the light direction is side lighting. In addition, if the gray scale sums or averages are less than a reference gray scale, for example, 127, it may be determined that the light direction is back lighting; otherwise, it may be determined that the light direction is front lighting.

The images according to the embodiments are exaggerated in terms of brightness and darkness of the left region and the right region of the subject to facilitate understanding.

Figure 14:
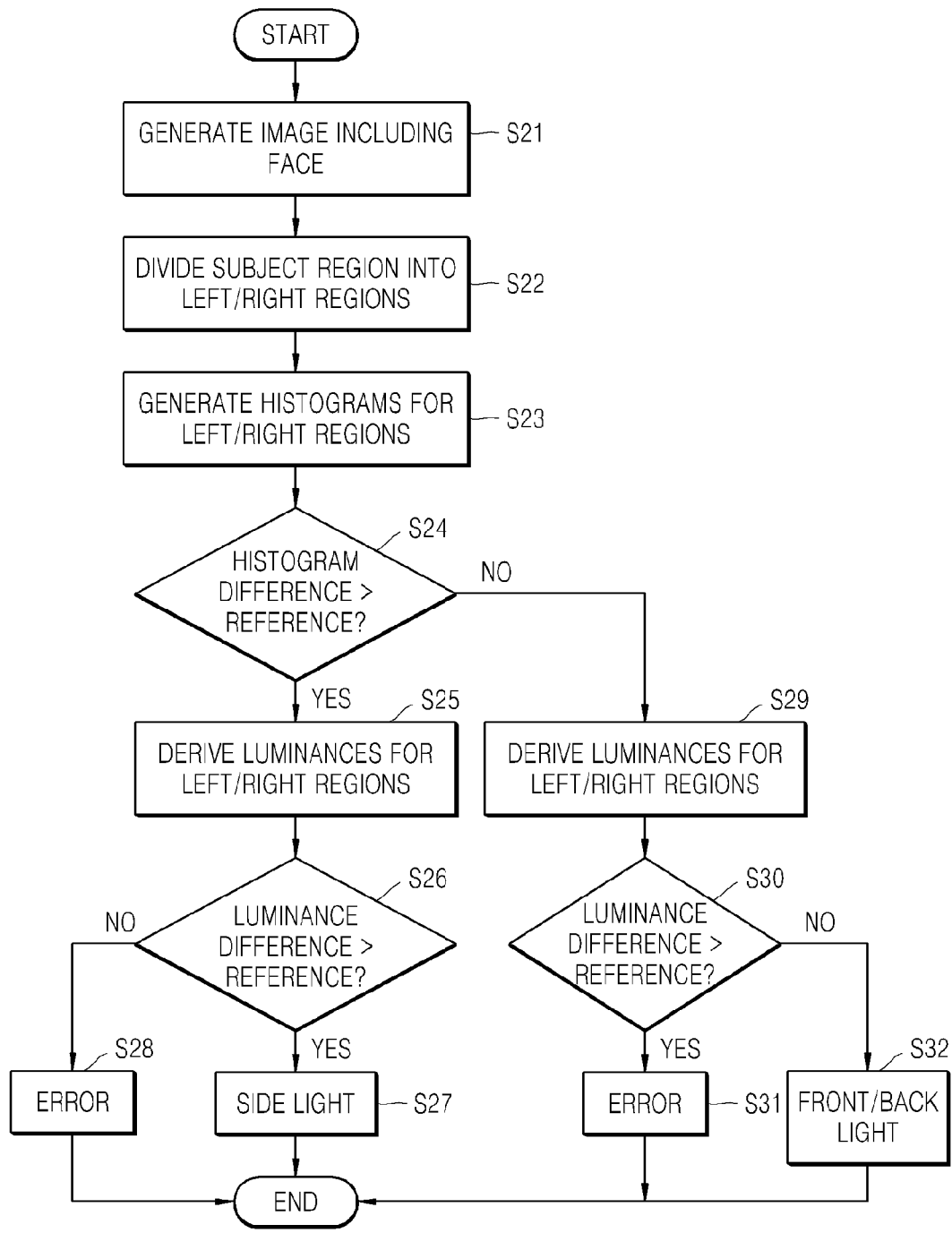
FIG. 14 is a flowchart of a method of processing a digital image signal according to another embodiment of the invention.

FIG. 14 is a flowchart of a method of processing a digital image signal according to another embodiment of the invention. In the current embodiment, it is primarily determined whether the light direction is side lighting, by using histograms and then it is secondarily determined whether the light direction is side lighting, by using luminances, thereby improving reliability.

Referring to FIG. 14, an image including a face as a subject is generated in operation S21. The face is recognized by using a face recognition algorithm, and a facial region is derived. In operation S22, the facial region is divided into a left region and a right region.

In operation S23, a histogram for the left region and a histogram the right region are generated.

In operation S24, a difference between the first histogram for the left region and the second histogram for the right region is compared with a predetermined reference value. The difference may be a difference between gray scales of peaks of the first histogram and the second histogram, a difference between gray scale sums of peak regions including the peaks, a difference between averages of the peak regions, or a difference between averages of gray scales of the histograms.

If the difference is greater than the reference value, a first luminance of the left region and a second luminance of the right region are derived in operation S25.

A difference between the first luminance of the left region and the second luminance of the right region is compared with a predetermined reference value in operation S26.

If the difference between the first luminance and the second luminance is greater than the reference value when the difference between the first histogram and the second histogram is greater than the reference value, it may be determined that the light direction is side lighting in operation S27.

If the difference between the first luminance and the second luminance is less than the reference value when the difference between the first histogram and the second histogram is greater than the reference value, this case corresponds to inconsistency between a result of analysis using histograms and a result of analysis using luminances, and thus it is determined that an error occurs in operation S28.

In operation S29, also when the difference between the first histogram and the second histogram is less than the reference value, the first luminance of the left region and the second luminance of the right region are derived.

In operation S30, a difference between the first luminance and the second luminance is compared with a predetermined reference value.

If the difference between the first luminance and the second luminance is greater than the reference value when the difference between the first histogram and the second histogram is less than the reference value, it may be determined that an error occurs in operation S31.

Alternatively, if the difference between the first luminance and the second luminance is less than the reference value when the difference between the first histogram and the second histogram is less than the reference value, it may be determined that the light direction is not side lighting. That is, it may be determined that the light direction is front/back lighting in operation S32.

Figure 15:
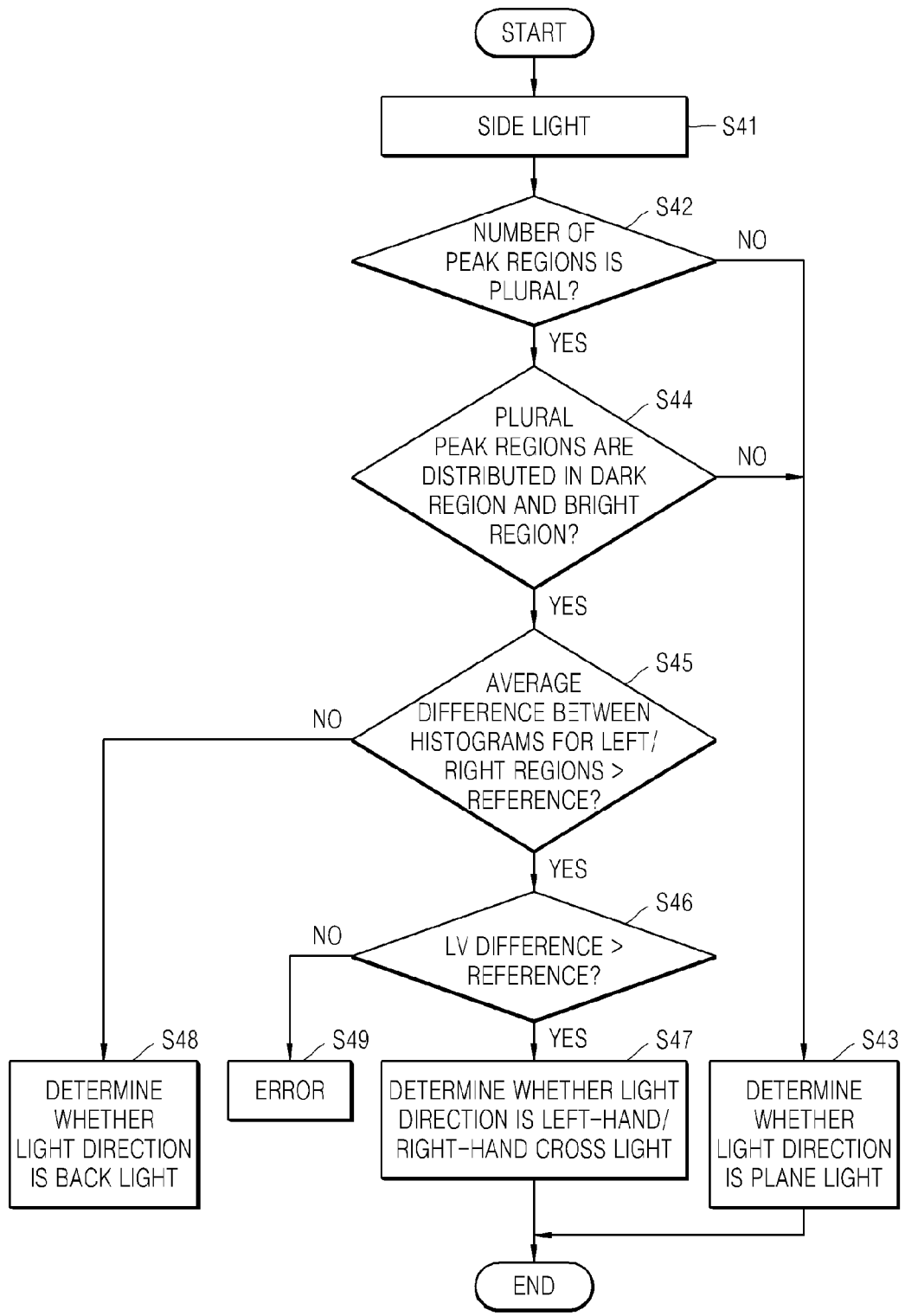
FIG. 15 is a flowchart of an operation of determining whether a light direction is cross lighting or plane lighting in a method of processing a digital image signal according to an embodiment of the invention.

FIG. 15 is a flowchart of an operation of determining whether the light direction is cross lighting or plane lighting in a method of processing a digital image signal according to another embodiment of the invention.

An image including a face is generated, a face region is derived by using a face recognition algorithm, and the facial region is divided into a left region and a right region. A first histogram for the left region is derived and a second histogram for the right region is derived, after which a peak region for each of the left region and the right region is derived in operation S41.

In operation S42, the number of peak regions in each of the first histogram for the left region and the second histogram for the right region. Herein, the peak region means a peak indicating a maximum point or a region of a specific range including the peak.

If the number of peak regions of the first histogram or the second histogram is not plural, it may be determined whether the light direction is side lighting or front/back lighting, by using histograms in operation S43.

If the number of peak regions is plural, it is determined whether peak regions are distributed in a dark region and a bright region in operation S44. The dark region and the bright region indicate different regions with respect to a reference gray scale. For example, if 127 is set to a reference gray scale in gray scales of 0 to 255, a region having gray scales between 0 and 127 may be set to a dark region and regions having gray scales between 128 and 255 may be set to bright regions.

If the peak regions are not distributed in the dark region and the bright region when the number of peak regions is plural, it may be determined whether the light direction is side lighting or front/back lighting, by using histograms in operation S43.

If the peak regions are distributed in the dark region and the bright region when the number of peak regions is plural, it may be directly determined that the light direction is cross lighting.

In the current embodiment, to improve the reliability of cross light determination, a difference between histograms for the left region and the right region is derived and it is determined that the difference is greater than a predetermined reference value in operation S45.

If the difference is less than the reference value, it may be determined that the light direction is front/back lighting in operation S48.

If the difference is greater than the reference value, a difference between a luminance LV for the left region and a luminance LV for the right region is compared with a predetermined reference value in operation S46.

If the difference between the luminances is less than the reference value when the difference between the histograms is greater than the reference value, this case corresponds to inconsistency between a result of analysis using the histograms and a result of analysis using the luminances, and thus it is determined that an error occurs in operation S49.

If the difference between the luminances is greater than the reference value, it may be determined that the light direction is cross lighting in operation S47.

Figure 16A:
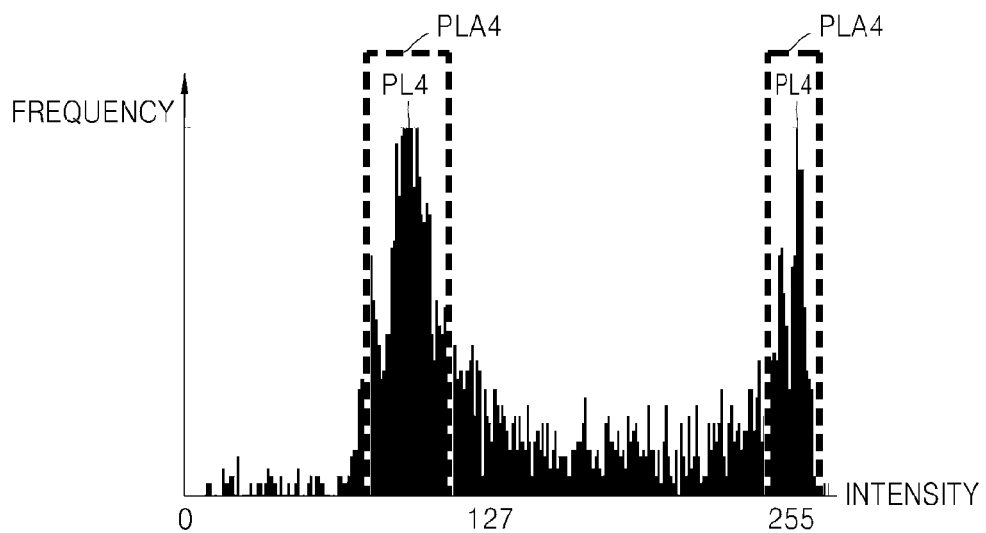
FIGS. 16A and 16B show histograms of a left region and a right region of a facial region in an image including a subject illuminated with back lighting.
Figure 16B:
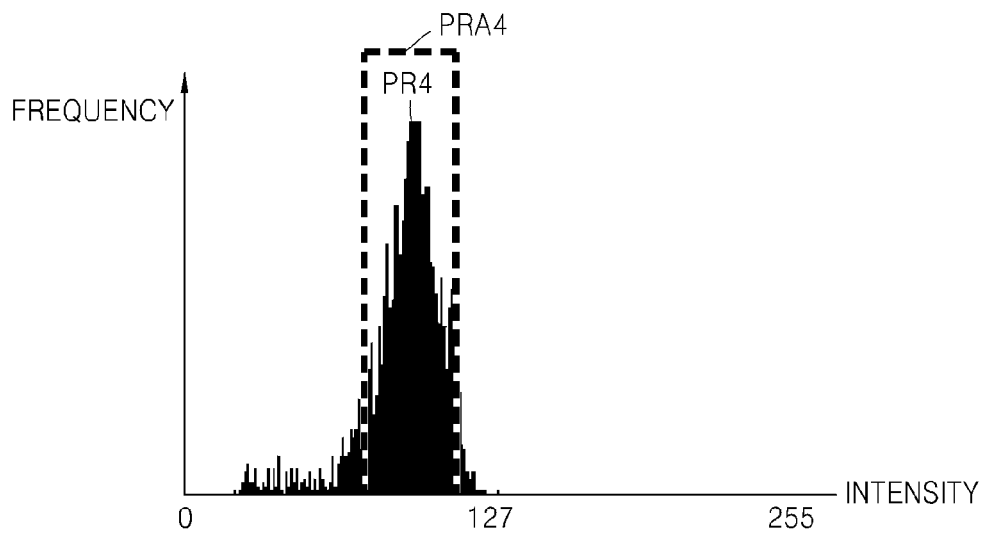

FIGS. 16A and 16B show histograms for an image of a subject illuminated with cross lighting. More specifically, FIG. 16A shows a first histogram for a left region of a facial region derived from cross lighting image and FIG. 16B shows a second histogram for a right region of the facial region.

Referring to FIG. 16A showing the first histogram for the left region, two peak regions PLA4 are derived, which are distributed in a region having gray scales lower than 127 (dark region) and in a region having gray scales higher than 127 (bright region). On the other hand, referring to FIG. 16B showing the second histogram for the right region, a peak region PRA4 is distributed in the dark region. A first average of the first histogram for the left region is 140 and a second average of the second histogram for the right region is 75, in which a difference between the first average and the second average is 50 which is greater than 50. Therefore, it can be determined that the light direction is cross lighting. Since the solar light (or artificial light) is irradiated to the subject behind the side and thus the solar light (or artificial light) is reflected around the edge of the face in the left region, the number of peak regions in the left or right side from which the solar light (or artificial light) is irradiated is plural in cross lighting condition. In particular, a plurality of peak regions are derived in the first histogram and are located in the dark region and the bright region, and the first average is greater than the second average, from which it can be determined that the light direction is left-hand cross lighting.

Figure 17:
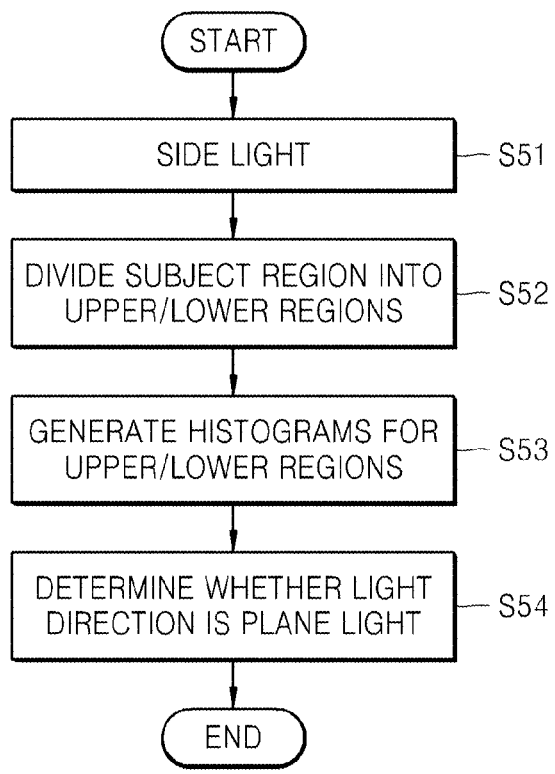
FIG. 17 is a flowchart of an operation of determining whether the light direction is plane lighting in a method of processing a digital image signal according to an embodiment of the invention.

FIG. 17 is a flowchart of an operation of determining whether the light direction is plane lighting in a method of processing a digital image signal according to an embodiment of the invention.

Referring to FIG. 17, after it is determined that the light direction is side lighting in operation S51, the facial region is divided into an upper region and a lower region in operation S52.

A third histogram for the upper region and a fourth histogram for the lower region are generated in operation S53, and a difference between the third histogram and the fourth histogram is analyzed to make cross lighting determination involving determination of whether the solar light (or artificial light) is irradiated from top, bottom, or front in operation S54.

For example, it is determined whether the light direction is left-hand side lighting or right-hand side lighting, by analyzing the first histogram for the left region and the second histogram for the right region, and if a difference between the third histogram and the fourth histogram is small, it may be determined whether the light direction is left-hand front side lighting or right-hand front side lighting. After the determination regarding left-hand side lighting or right-hand side lighting through the analysis of the first histogram and the second histogram, if the difference between the third histogram and the fourth histogram is large, it may be determined whether the light direction is one of the left-hand top side light, the left-hand bottom side light, the right-hand top side light, and the right-hand bottom side light, by comparing the third histogram with the fourth histogram.

Figure 18:
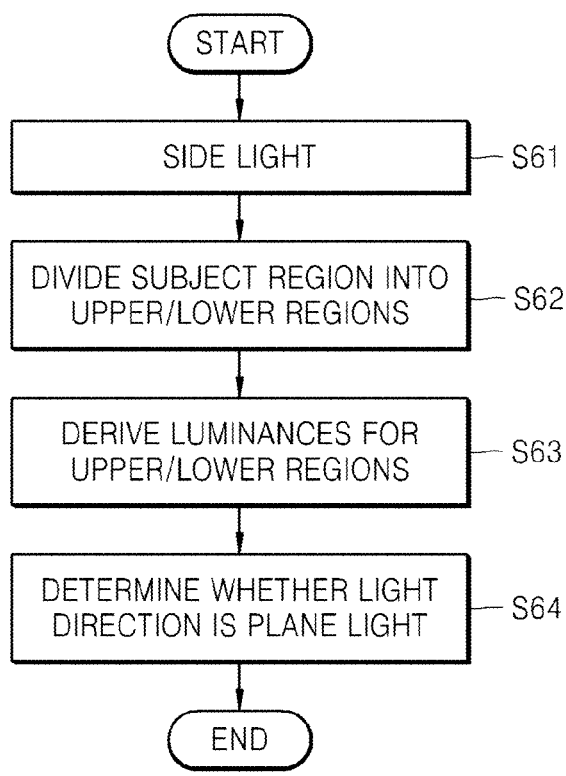
FIG. 18 is a flowchart of an operation of determining whether the light direction is plane lighting in a method of processing a digital image signal according to another embodiment of the invention.

FIG. 18 is a flowchart of an operation of determining whether the light direction is plane lighting in a method of processing a digital image signal according to another embodiment of the invention.

Referring to FIG. 18, after it is determined that the light direction is side lighting in operation S61, the facial region is divided into the upper region and the lower region in operation S62.

The luminance LV for the upper region and the luminance LV for the lower region are derived in operation S63, and the luminances are compared with each other to determine whether the light direction is cross lighting in operation S64.

After it is determined whether the light direction is side lighting, by using the histograms for the left region and the right region of the facial region, it may be further determined that the light direction is cross lighting as a type of side lighting by using the luminances of the upper region and the lower region. For example, it is determined whether the light direction is left-hand side lighting or right-hand side lighting by using the histograms for the left region and the right region, and it may be determined that the light direction is left-hand front side lighting if a difference between the luminances of the upper region and the lower region is less than a reference value in case of left-hand side lighting. In case of left-hand side lighting, if the luminance of the upper region is greater than that of the lower region, it may be determined that the light direction is the left-hand top side light; otherwise, it may be determined that the light direction is the left-hand bottom side light. In case of right-hand side lighting, it may be determined whether the light direction is one of right-hand front side lighting, the right-hand top side light, and the right-hand bottom side light in the similar manner to the foregoing method.

Figure 19:
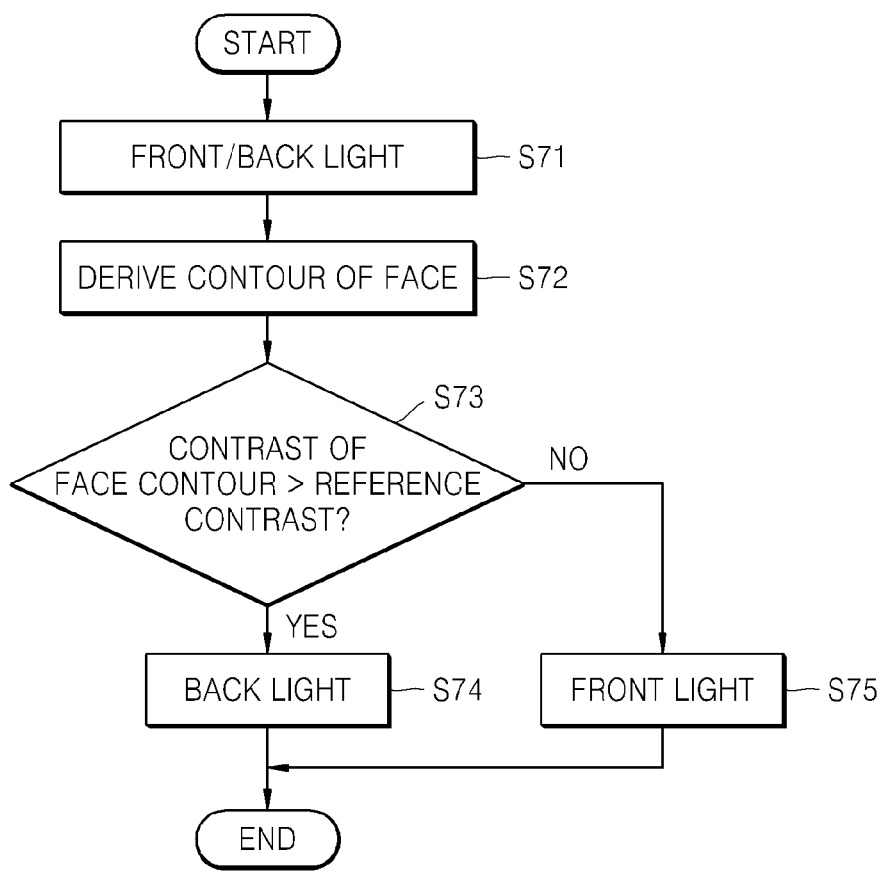
FIG. 19 is a flowchart of an operation of determining whether the light direction is front lighting or back lighting in a method of processing a digital image signal according to an embodiment of the invention.

FIG. 19 is a flowchart of an operation of determining whether the light direction is front lighting or back lighting in a method of processing a digital image signal according to an embodiment of the invention.

Referring to FIG. 19, it is determined whether the light direction is front/back lighting by using histograms for the left region and the right region of the facial region in operation S71, after which the contour of the face is derived in operation S72. The contour of the face may be derived by detecting edge components from the facial region.

The contrast of the contour of the face is compared with a reference contrast in operation S73. If the contrast of the contour of the face is greater than the reference contrast, it may be determined that the light direction is back lighting in operation S74. If the contrast of the contour of the face is less than the reference contrast, it may be determined that the light direction is front lighting in operation S71.

Figure 20:
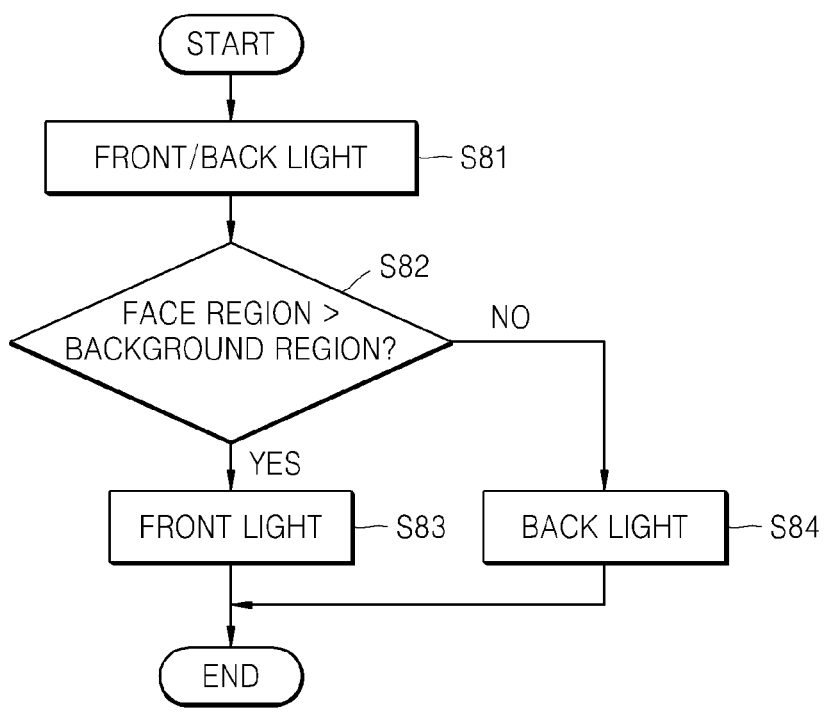
FIG. 20 is a flowchart of an operation of determining whether the light direction is front lighting or back lighting in a method of processing a digital image signal according to another embodiment of the invention.

FIG. 20 is a flowchart of an operation of determining whether the light direction is front lighting or back lighting in a method of processing a digital image signal according to another embodiment of the invention.

Referring to FIG. 20, after it is determined whether the light direction is front/back lighting by using histograms for a left region and a right region of a facial region in operation S81, a luminance of the facial region and a luminance of a background region except for the facial region are compared in operation S82.

If the luminance of the facial region is greater than that of the background region, it is determined that the light direction is front lighting in operation S83.

If the luminance of the facial region is less than that of the background region, it is determined that the light direction is back lighting in operation S84.

After it is determined that the light direction is front/back lighting by using the histograms for the facial regions, if the histogram is located in a region having gray scales being less than a predetermined reference value, it may be determined that the light direction is back lighting. That is, although determination regarding front/back lighting may be made by using only histograms, the determination may be performed further by using contrast information of a facial contour or luminance information regarding the facial region and the background region to improve reliability.

FIGS. 21A through 24B illustrate examples of user interfaces which indicate front lighting to a user.

Figure 21A:
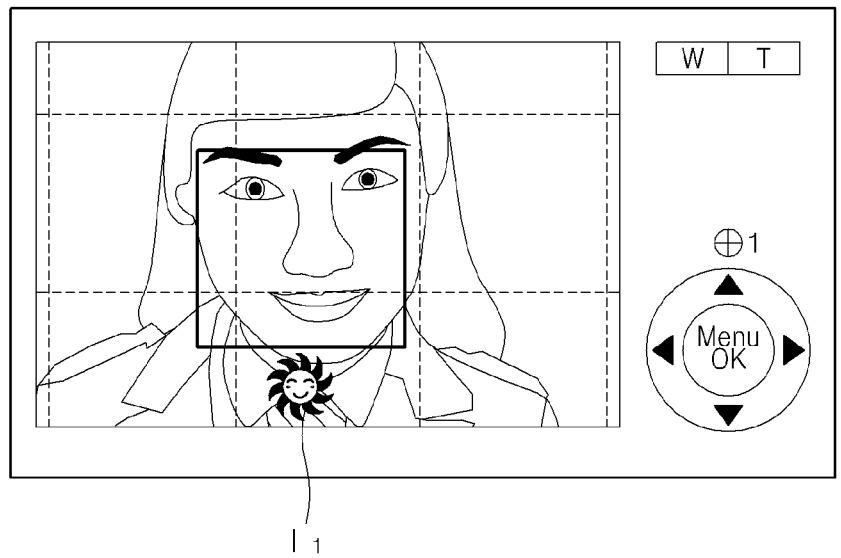
FIGS. 21A and 21B illustrate examples of user interfaces which indicate front lighting to a user.
Figure 21B:
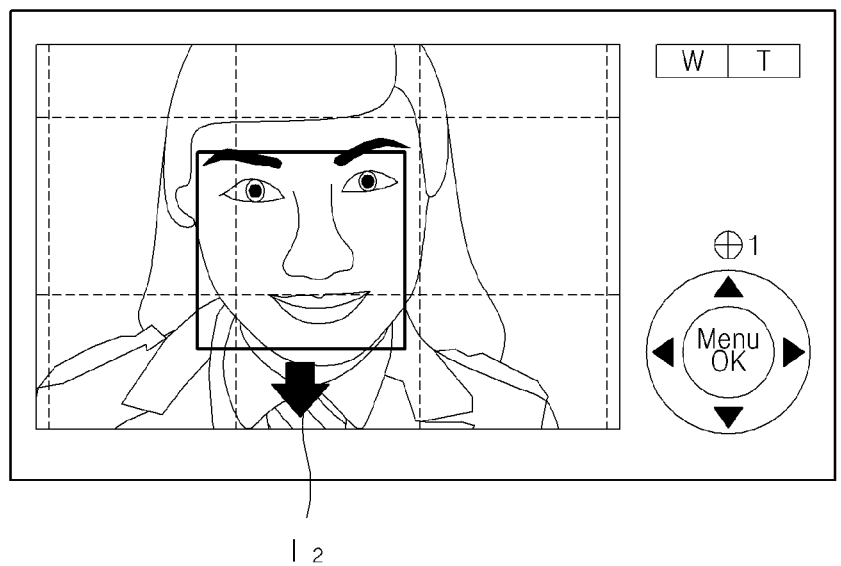

Referring to FIGS. 21A and 21B, if it is determined that the light direction is front lighting in the aforementioned ways, icons $I_1$ and $I_2$ indicating front lighting are shown. Front lighting is where the solar light (or artificial light) is irradiated in front of the subject. In this case, the icons $I_1$ and $I_2$ are displayed below the subject. The compact digital still camera according to the current embodiment determines that the light direction is front lighting, and displays the icons $I_1$ and $I_2$ to indicate front lighting to the user.

Figure 22A:
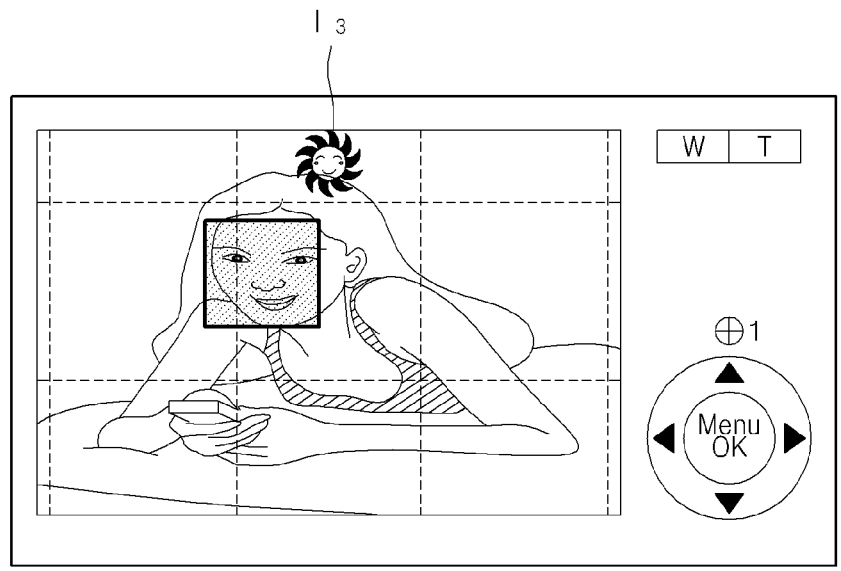
FIGS. 22A and 22B illustrate examples of user interfaces which indicate back lighting to a user.
Figure 22B:
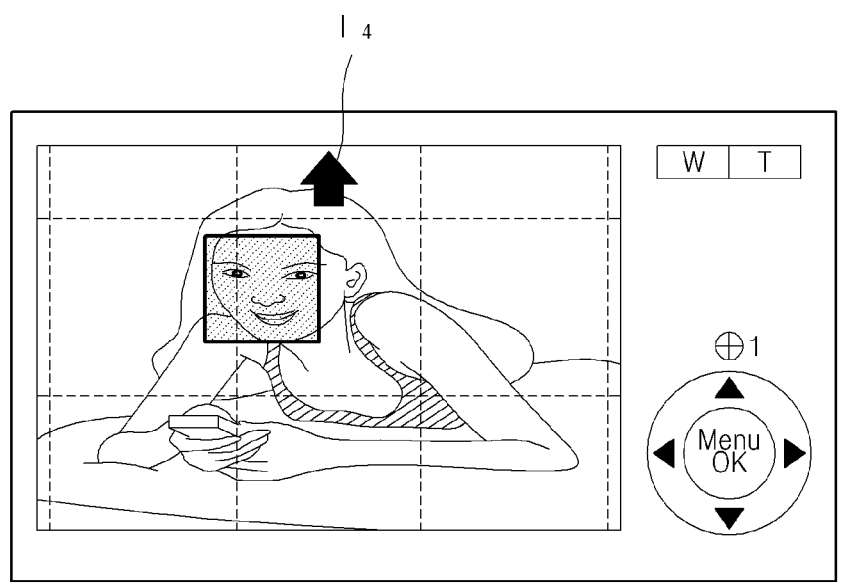

FIGS. 22A and 22B illustrate examples of icons $I_3$ and $I_4$ indicating back lighting when it is determined that the light direction is back lighting. Back lighting is where the solar light (or artificial light) is irradiated behind a subject. In this case, the icons $I_3$ and $I_4$ are displayed above the subject by way of example.

Figure 23A:
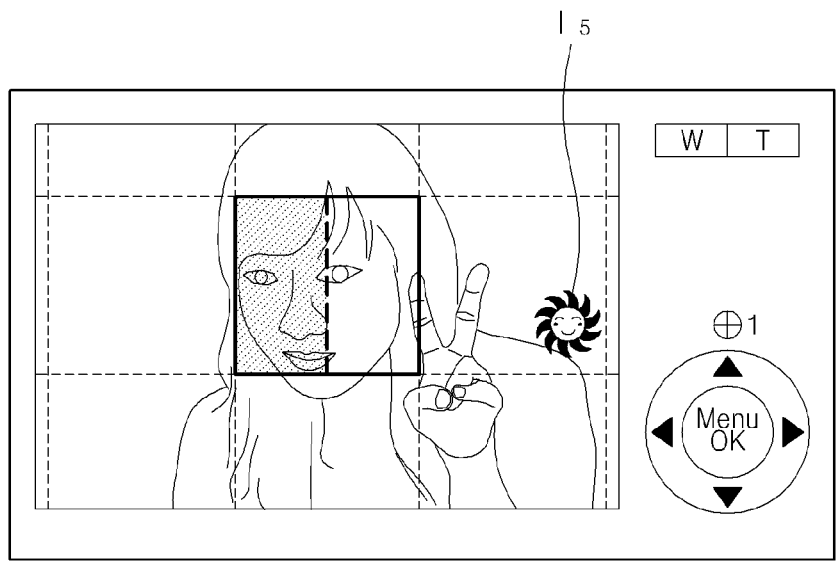
FIGS. 23A and 23B illustrate examples of user interfaces which indicate side lighting to a user.
Figure 23B:
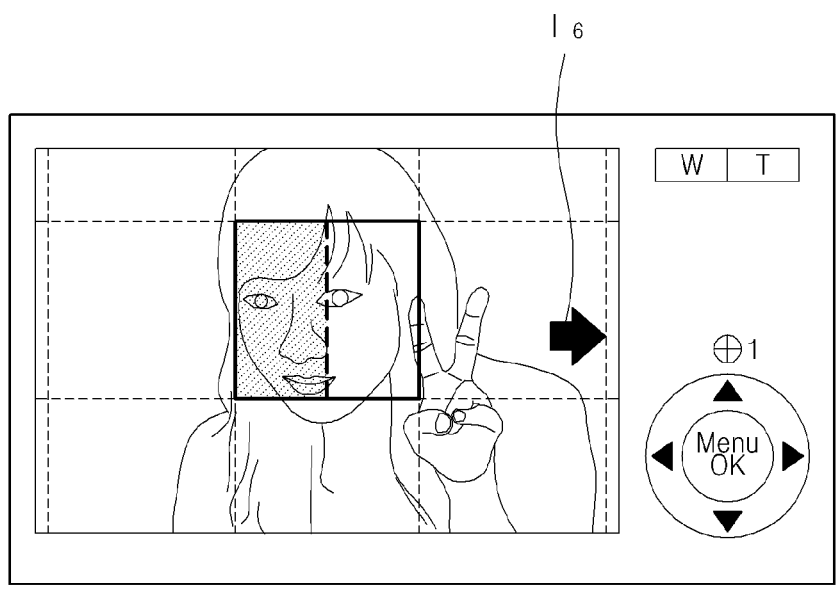

FIGS. 23A and 23B illustrate examples of user interfaces indicating side lighting to the user. More specifically, in the current embodiment, icons $I_5$ and $I_6$ indicating right-hand side lighting are displayed. Right-hand side lighting is where the solar light (or artificial light) is irradiated from the right side of the subject. In this case, the right region of the facial region of the subject is shown brighter than the left region of the facial region.

Figure 24A:
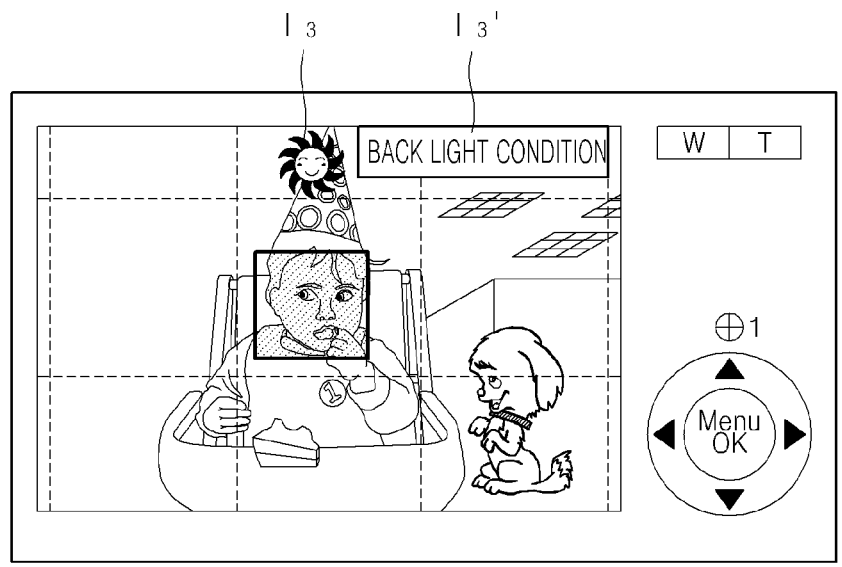
FIG. 24A illustrates a user interface which indicates back lighting to a user.
Figure 24B:
FIG. 24B illustrates an image which has been quality-corrected in back lighting condition.

FIG. 24A illustrates user interfaces $I_3$ and $I_3'$ indicating back lighting to a user, and FIG. 24B illustrates an image which has been quality-corrected in back lighting condition.

As described above, a position or direction of the solar light (or artificial light) is recognized by using histogram information regarding a subject region and the position is indicated to a user for facilitating the use. Moreover, the apparatus may perform image quality correction by taking into account the position of the solar light (or artificial light), allowing the user to obtain an image of a desired quality. The apparatus for processing a digital image may include a unit for quality correction based on the direction of the light striking the subject and determined by the apparatus.

As is apparent from the foregoing description, the invention provides a method and apparatus for processing a digital image signal, which easily can determine whether the light direction is side lighting by using histograms of a subject image. Moreover, by determining whether the light direction is back lighting, a user can obtain an image of a desired quality.

The invention can be embodied as a computer-readable code on a computer-readable recording medium. The computer-readable recording medium is any data storage device that can store data which can be thereafter read by a computer system.

Examples of computer-readable recording media include read-only memory (ROM), random-access memory (RAM), CD-ROMs, magnetic tapes, floppy disks, optical data storage devices, and carrier waves. The computer-readable recording medium can also be distributed over network of coupled computer systems so that the computer-readable code is stored and executed in a decentralized fashion. The computer-readable recording medium may be limited to physical medium.

The functionality associated with describing embodiments of the invention was described with a number of illustrative units. The units may be differently arranged so that the functionality of a single unit may be implemented with two or more units and the functionality of two or more units may be combined into a single unit. Moreover, the functionality may be differently arranged between illustrative units.

The various illustrative logics, logical blocks, units, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A method of processing a digital image signal, the method comprising:
   generating an image including a subject which is a face;
   forming a subject region by detecting the subject from the image;
   dividing the subject region into at least two regions including a left region and a right region;
   generating a first histogram for the left region of the subject region and a second histogram for the right region of the subject region; and
   determining whether a light direction is side lighting by analyzing the histograms for the at least two regions that includes:
      comparing a gray scale difference between a first peak region including a first peak in the first histogram and a second peak region including a second peak in the second histogram with a first reference value;
      determining that the light direction is side lighting if the gray scale difference is greater than the first reference value; and
      determining that the light direction is front/back lighting if the gray scale difference is not greater than the first reference value.

2. The method of claim 1, further comprising, if it is determined that the light direction is side lighting:
   comparing gray scales of the first peak region with gray scales of the second peak region;
   determining that the light direction is left-hand side lighting if the gray scales of the first peak region are greater than those of the second peak region; and
   determining that the light direction is right-hand side lighting if the gray scales of the first peak region are not greater than those of the second peak region.

3. The method of claim 1, further comprising, if it is determined that the light direction is front/back lighting:
   comparing gray scales of the first peak region or gray scales of the second peak region with a first reference gray scale;
   determining that the light direction is back lighting if the first peak region is located in a region having gray scales being less than the first reference gray scale in the first histogram or if the second peak region is located in a region having gray scales being less than the first reference gray scale in the second histogram; and
   determining that the light direction is front lighting if the first peak region is located in a region having gray scales exceeding the first reference gray scale in the first histogram or if the second peak region is located in a region having gray scales exceeding the first reference gray scale in the second histogram.

4. The method of claim 1, further comprising, in addition to the analyzing of the histograms for the at least two regions:
   deriving a first luminance for the left region of the subject region;
   deriving a second luminance for the right region of the subject region;
   comparing a difference between the first luminance and the second luminance with a second reference value;
   determining that the light direction is side lighting if the difference is greater than the second reference value; and
   determining that the light direction is front/back lighting if the difference is not greater than the second reference value.

5. The method of claim 4, further comprising, if it is determined that the light direction is side lighting:
   comparing the first luminance with the second luminance;
   determining that the light direction is left-hand side lighting if the first luminance is greater than the second luminance; and
   determining that the light direction is right-hand side lighting if the first luminance is not greater than the second luminance.

6. The method of claim 4, further comprising, if it is determined that the light direction is front/back lighting:
   comparing the first luminance or the second luminance with a reference luminance;
   determining that the light direction is back lighting if the first luminance or the second luminance is not greater than the reference luminance; and
   determining that the light direction is front lighting if the first luminance or the second luminance is greater than the reference luminance.

7. The method of claim 1, further comprising:
   deriving a contour of the subject;
   comparing a contrast of the contour of the subject with a reference contrast; and
   determining that the light direction is back lighting if the contrast of the contour of the subject is greater than the reference contrast.

8. The method of claim 1, further comprising:
   deriving a luminance of the subject region and a luminance of a background region remaining after excluding the subject region; and
   determining whether the light direction is back lighting by analyzing the luminance of the subject region and the luminance of the background region.

9. The method of claim 1, further comprising dividing the subject region into an additional two regions including an upper region and a lower region if it is determined that the light direction is side lighting.

10. The method of claim 9, further comprising:
    generating a third histogram for the upper region of the subject region and a fourth histogram for the lower region of the subject region; and
    determining whether the light direction is one of left-hand front side lighting, right-hand front side lighting, left-hand plane lighting, and right-hand plane lighting by analyzing the third histogram and the fourth histogram.

11. The method of claim 9, further comprising:
deriving a first luminance for the upper region of the subject region and a second luminance for the lower region of the subject region; and
determining whether the light direction is one of left-hand front side lighting, right-hand front side lighting, left-hand plane lighting, and right-hand plane lighting by analyzing the first luminance and the second luminance.

12. The method of claim 1, further comprising:
deriving a number of first peak regions including the first peak in the first histogram and a number of second peak regions including the second peak in the second histogram;
if the number of first peak regions is plural or the number of second peak regions is plural, determining whether the plural first peak regions or the plural second peak regions are distributed in a dark region and a bright region of the first histogram or the second histogram; and
determining that the light direction is cross lighting if the plural first peak regions or the plural second peak regions are distributed in the dark region and the bright region of the first histogram or the second histogram.

13. The method of claim 12, further comprising, if the number of first peak regions is plural or the number of second peak regions is plural:
comparing a difference between a first average of the first histogram and a second average of the second histogram with a second reference value; and
determining that the light direction is cross lighting if the difference between the first average and the second average is greater than the second reference value.

14. The method of claim 12, further comprising, if the number of first peak regions is plural or the number of second peak regions is plural:
comparing a difference between a first luminance of the left region and a second luminance of the right region with a second reference value; and
determining that the light direction is cross lighting if the difference between the first luminance and the second luminance is greater than the second reference value.

15. The method of claim 12, further comprising:
determining that the light direction is left-hand cross lighting if the plural first peak regions are located in the left side and the right side with respect to a reference gray scale of the first histogram; and
determining that the light direction is right-hand cross lighting if the plural second peak regions are located in the left side and the right side with respect to a reference gray scale of the second histogram.

16. The method of claim 1, further comprising:
dividing the subject region into four regions including an upper region, a lower region, the left region, and the right region;
generating histograms for the four regions; and
determining whether the light direction is one of front lighting, back lighting, left-hand front side lighting, right-hand front side lighting, left-hand plane lighting, right-hand plane lighting, left-hand cross lighting, and right-hand cross lighting by analyzing peak regions including peaks in or averages of the histograms for the four regions.

17. The method of claim 16, further comprising, in addition to the analyzing of the peak regions in or the averages of the histograms:
deriving luminances for the four regions; and
determining whether the light direction is one of front lighting, back lighting, left-hand front side lighting, right-hand front side lighting, left-hand plane lighting, right-hand plane lighting, left-hand cross lighting, and right-hand cross lighting by analyzing the luminances for the four regions.

18. The method of claim 1, further comprising:
indicating to a user that the light direction is side lighting if it is determined that the light direction is side lighting.

19. The method of claim 1, further comprising:
correcting the digital image signal to remove effect of side lighting, if it is determined that the light direction is side lighting.

20. A non-transitory computer program product, comprising a non-transitory computer usable medium having a computer readable program code embodied therein, said computer readable program code when executed implements a method, said method of processing a digital image signal comprising:
generating an image including a subject which is a face;
forming a subject region by detecting the subject from the image;
dividing the subject region into at least two regions including a left region and a right region;
generating a first histogram for the left region of the subject region and a second histogram for the right region of the subject region; and
determining whether a light direction is side lighting by analyzing the histograms for the at least two regions that includes:
comparing a gray scale difference between a first peak region including a first peak in the first histogram and a second peak region including a second peak in the second histogram with a first reference value;
determining that the light direction is side lighting if the gray scale difference is greater than the first reference value; and
determining that the light direction is front/back lighting if the gray scale difference is not greater than the first reference value.

21. An apparatus for processing a digital image signal, the apparatus comprising:
an image generation unit that generates an image including a subject which is a face;
a subject recognition unit that forms a subject region by detecting the subject from the image;
a region division unit that divides the subject region into at least two regions including a left region and a right region;
a histogram generation unit that generates a first histogram for the left region of the subject region and a second histogram for the right region of the subject region; and
a light direction determination unit that determines whether a light direction is side lighting by analyzing the histograms for the at least two regions that includes:
comparing a gray scale difference between a first peak region including a first peak in the first histogram and a second peak region including a second peak in the second histogram with a first reference value;
determining that the light direction is side lighting if the gray scale difference is greater than the first reference value; and
determining that the light direction is front/back lighting if the gray scale difference is not greater than the first reference value.

22. The apparatus of claim 21, wherein if the light determination unit determines that the light direction is side lighting, the light direction determination unit further:
- compares gray scales of the first peak region with gray scales of the second peak region; and
- determines that the light direction is left-hand side lighting if the gray scales of the first peak region are greater than those of the second peak region, and determining that the light direction is right-hand side lighting if the gray scales of the first peak region are not greater than those of the second peak region.

23. The apparatus of claim 21, wherein if the light determination unit determines that the light direction is front/back lighting, the light direction determination unit further:
- compares gray scales of the first peak region or gray scales of the second peak region with a first reference gray scale; and
- determines that the light direction is back lighting if the first peak region is located in a region having gray scales being less than the first reference gray scale in the first histogram or if the second peak region is located in a region having gray scales being less than the first reference gray scale in the second histogram, and determining that the light direction is front lighting if the first peak region is located in a region having gray scales exceeding the first reference gray scale in the first histogram or if the second peak region is located in a region having gray scales exceeding the first reference gray scale in the second histogram.

24. The apparatus of claim 21, further comprising a luminance derivation unit deriving a first luminance for the left region of the subject region and deriving a second luminance for the right region of the subject region,
- wherein the light direction determination unit further comprises:
  - a luminance difference calculation unit deriving a difference between the first luminance and the second luminance;
  - a first luminance comparison unit comparing the difference between the first luminance and the second luminance with a second reference value; and
  - a first luminance determination unit determining that the light direction is side lighting if the difference is greater than the second reference value, and determining that the light direction is front/back lighting if the difference is not greater than the second reference value.

25. The apparatus of claim 24, wherein if the first luminance determination unit determines that the light direction is side lighting, the light direction determination unit further comprises:
- a second luminance comparison unit comparing the first luminance with the second luminance; and
- a second luminance determination unit determining that the light direction is left-hand side lighting if the first luminance is greater than the second luminance, and determining that the light direction is right-hand side lighting if the first luminance is not greater than the second luminance.

26. The apparatus of claim 24, wherein if the first luminance determination unit determines that the light direction is front/back lighting, the light direction determination unit further comprises:
- a second luminance comparison unit comparing the first luminance or the second luminance with a reference luminance; and
- a second luminance determination unit determining that the light direction is back lighting if the first luminance or the second luminance is not greater than the reference luminance, and determining that the light direction is front lighting if the first luminance or the second luminance is greater than the reference luminance.

27. The apparatus of claim 24, if the first luminance determination unit determines that the light direction is side lighting, the light direction determination unit further comprises:
- a peak region derivation unit deriving a number of first peak regions including the first peak in the first histogram and a number of second peak regions including the second peak in the second histogram; and
- a back lighting determination unit determining that the light direction is cross lighting if plural first peak regions or plural second peak regions are distributed in a dark region and a bright region of the first histogram or the second histogram.

28. The apparatus of claim 27, wherein the light direction determination unit further comprises, if the number of first peak regions is plural or the number of second peak regions is plural, an average difference calculation unit deriving a first average of the first histogram and a second average of the second histogram, and
- the back lighting determination unit compares a difference between the first average and the second average with a third reference value and determines that the light direction is cross lighting if the difference between the first average and the second average is greater than the third reference value.

29. The apparatus of claim 27, wherein the light direction determination unit further comprises, if the number of first peak regions is plural or the number of second peak regions is plural, and
- the back lighting determination unit compares the difference between the first luminance and the second luminance with a third reference value, and determines that the light direction is cross lighting if the difference between the first luminance and the second luminance is greater than the third reference value.

30. The apparatus of claim 27, wherein the back lighting determination unit determines that the light direction is left-hand cross lighting if the plural first peak regions are located in the left side and the right side with respect to a reference gray scale of the first histogram, and determines that the light direction is right-hand cross lighting if the plural second peak regions are located in the left side and the right side with respect to a reference gray scale of the second histogram.

31. The apparatus of claim 21, wherein the light direction determination unit further comprises:
- a contour derivation unit deriving a contour of the subject; and
- a back lighting determination unit comparing a contrast of the contour of the subject with a reference contrast, and determining that the light direction is back lighting if the contrast of the contour of the subject is greater than the reference contrast.

32. The apparatus of claim 21, further comprising a luminance derivation unit deriving a luminance of the subject region and a luminance of a background region remaining after excluding the subject region,
- wherein the light direction determination unit determines whether the light direction is back lighting by analyzing the luminance of the subject region and the luminance of the background region.

33. The apparatus of claim 21, wherein if the light direction determination unit determines that the light direction is side lighting, the region division unit further divides the subject region into an additional two regions including an upper region and a lower region.

34. The apparatus of claim 33, wherein the histogram generation unit generates a third histogram for the upper region of the subject region and a fourth histogram for the lower region of the subject region, and the light direction determination unit determines whether the light direction is one of left-hand front side lighting, right-hand front side lighting, left-hand plane lighting, and right-hand plane lighting by analyzing the third histogram and the fourth histogram.

35. The apparatus of claim 33, further comprising a luminance derivation unit deriving a first luminance for the upper region of the subject region and a second luminance for the lower region of the subject region, wherein the light direction determination unit determines whether the light direction is one of left-hand front side lighting, right-hand front side lighting, left-hand plane lighting, and right-hand plane lighting by analyzing the first luminance and the second luminance.

36. The apparatus of claim 21, wherein the region division unit divides the subject region into four regions including an upper region, a lower region, the left region, and the right region, the histogram generation unit generates histograms for the four regions, and the light direction determination unit determines whether the light direction is one of front lighting, back lighting, left-hand front side lighting, right-hand front side lighting, left-hand plane lighting, right-hand plane lighting, left-hand cross lighting, and right-hand cross lighting by analyzing peak regions including peaks in or averages of the histograms for the four regions.

37. The apparatus of claim 36, further comprising a luminance derivation unit deriving luminances for the four regions, wherein the light direction determination unit determines whether the light direction is one of front lighting, back lighting, left-hand front side lighting, right-hand front side lighting, left-hand plane lighting, right-hand plane lighting, left-hand cross lighting, and right-hand cross lighting by analyzing the luminances for the four regions.

38. The apparatus of claim 21, wherein the image generation unit is configured to display an icon to a user indicating the determined light direction.

39. The apparatus of claim 21, wherein the apparatus is configured to perform image quality correction based on the determined light direction.

40. A method of processing a digital image signal, the method comprising:

generating an image including a subject which is a face;
forming a subject region by detecting the subject from the image;
dividing the subject region into at least two regions including a left region and a right region;
generating a first histogram for the left region of the subject region and a second histogram for the right region of the subject region; and
determining whether a light direction is side lighting by analyzing the histograms for the at least two regions that includes:
comparing a difference between a first average of the first histogram and a second average of the second histogram with a first reference value;
determining that the light direction is side lighting if the difference between the first average and the second average is greater than the first reference value; and
determining that the light direction is front/back lighting if the difference between the first average and the second average is not greater than the first reference value.

41. The method of claim 40, further comprising, if it is determined that the light direction is side lighting:

comparing the first average with the second average;
determining that the light direction is left-hand side lighting if the first average is greater than the second average; and
determining that the light direction is right-hand side lighting if the first average is not greater than the second average.

42. The method of claim 40, further comprising, if it is determined that the light direction is front/back lighting:

comparing the first average or the second average with a first reference gray scale;
determining that the light direction is back lighting if the first average or the second average is less than the first reference gray scale; and
determining that the light direction is front lighting if the first average or the second average exceeds the first reference gray scale.

43. An apparatus for processing a digital image signal, the apparatus comprising:

an image generation unit that generates an image including a subject which is a face;
a subject recognition unit that forms a subject region by detecting the subject from the image;
a region division unit that divides the subject region into at least two regions including a left region and a right region;
a histogram generation unit that generates a first histogram for the left region of the subject region and a second histogram for the right region of the subject region; and
a light direction determination unit that determines whether a light direction is side lighting by analyzing the histograms for the at least two regions, comprising:
an average calculation unit deriving a first average of the first histogram and a second average of the second histogram;
an average difference calculation unit deriving a difference between the first average and the second average;
a first comparison unit comparing the difference between the first average and the second average with a first reference value; and
a first determination unit determining that the light direction is side lighting if the difference between the first average and the second average is greater than the first reference value, and determining that the light direction is front/back lighting if the difference between the first average and the second average is not greater than the first reference value.

44. The apparatus of claim 43, wherein if the first determination unit determines that the light direction is side lighting, the light direction determination unit further comprises:

a second comparison unit comparing the first average with the second average; and
a second determination unit determining that the light direction is left-hand side lighting if the first average is greater than the second average, and determining that the light direction is right-hand side lighting if the first average is not greater than the second average.

45. The apparatus of claim 43, if the first determination unit determines that the light direction is front/back lighting, the light direction determination unit further comprises:
- a second comparison unit comparing the first average or the second average with a first reference gray scale; and
- a second determination unit determining that the light direction is back lighting if the first average or the second average is less than the first reference gray scale, and determining that the light direction is front lighting if the first average or the second average exceeds the first reference gray scale.

46. A non-transitory computer program product, comprising a non-transitory computer usable medium having a computer readable program code embodied therein, said computer readable program code when executed implements a method, said method of processing a digital image signal comprising:
- generating an image including a subject which is a face;
- forming a subject region by detecting the subject from the image;
- dividing the subject region into at least two regions including a left region and a right region;
- generating a first histogram for the left region of the subject region and a second histogram for the right region of the subject region; and
- determining whether a light direction is side lighting by analyzing the histograms for the at least two regions that includes:
  - comparing a difference between a first average of the first histogram and a second average of the second histogram with a first reference value;
  - determining that the light direction is side lighting if the difference between the first average and the second average is greater than the first reference value; and
  - determining that the light direction is front/back lighting if the difference between the first average and the second average is not greater than the first reference value.

* * * * *